US010182099B2

(12) United States Patent
Dziezanowski et al.

(10) Patent No.: US 10,182,099 B2
(45) Date of Patent: Jan. 15, 2019

(54) WEB ENABLED INTERFACE FOR AN EMBEDDED SERVER

(71) Applicant: Microscan Systems, Inc., Renton, WA (US)

(72) Inventors: Joseph J. Dziezanowski, Salisbury, NH (US); Erik S. Lewerenz, Coeur d'Alene, ID (US); Darren Prevost, Merrimack, NH (US); Matthew Van Bogart, Issaquah, WA (US)

(73) Assignee: Omron Corp., Kyoto (JP)

(*) Notice: Subject to any disclaimer, the term of this patent is extended or adjusted under 35 U.S.C. 154(b) by 182 days.

(21) Appl. No.: 15/094,977

(22) Filed: Apr. 8, 2016

(65) Prior Publication Data

US 2016/0301774 A1    Oct. 13, 2016

Related U.S. Application Data

(60) Provisional application No. 62/145,401, filed on Apr. 9, 2015.

(51) Int. Cl.
| | |
|---|---|
| *G06F 15/16* | (2006.01) |
| *H04L 29/08* | (2006.01) |
| *G06F 17/30* | (2006.01) |
| *H04L 29/06* | (2006.01) |

(52) U.S. Cl.
CPC ........ *H04L 67/02* (2013.01); *G06F 17/30575* (2013.01); *H04L 67/1095* (2013.01); *H04L 67/1097* (2013.01); *H04L 67/2804* (2013.01); *H04L 67/2842* (2013.01); *H04L 69/14* (2013.01); *G06F 2201/84* (2013.01)

(58) Field of Classification Search
CPC . H04L 67/02; H04L 67/1095; H04L 67/1097; H04L 67/2804; H04L 67/2842; H04L 69/14; G06F 17/30575; G06F 2201/84
USPC ........ 703/203, 204; 709/203, 204, 205, 208
See application file for complete search history.

(56) References Cited

U.S. PATENT DOCUMENTS

| | | | |
|---|---|---|---|
| 6,701,324 B1 | 3/2004 | Cochran et al. | |
| 7,043,532 B1 * | 5/2006 | Humpleman | H04L 12/2805 709/208 |
| 7,085,814 B1 * | 8/2006 | Gandhi | H04L 29/1232 709/208 |
| 7,426,734 B2 * | 9/2008 | Debique | G06F 8/20 718/104 |

(Continued)

FOREIGN PATENT DOCUMENTS

| | | |
|---|---|---|
| EP | 2538999 | 1/2014 |
| KR | 1020080114084 | 12/2008 |

OTHER PUBLICATIONS

International Search Report and Written Opinion for PCT Application No. PCT/US2016/026823 dated Jul. 1, 2016, 12 pages.

(Continued)

*Primary Examiner* — Thu Ha T Nguyen
(74) *Attorney, Agent, or Firm* — Womble Bond Dickinson (US) LLP

(57) ABSTRACT

Methods, systems and an apparatus for a web-based interface to an embedded web server that facilitates accessing and presenting complex data on any web-enabled device using standard data communication protocols without disrupting the operation of the data acquisition device in which the web server is embedded.

25 Claims, 19 Drawing Sheets

(56) References Cited

U.S. PATENT DOCUMENTS

| | | | |
|---|---|---|---|
| 7,430,583 B2 | 9/2008 | Bodin et al. | |
| 7,702,724 B1 | 4/2010 | Brydon et al. | |
| 8,924,928 B1* | 12/2014 | Belovich | H04L 69/329 706/45 |
| 2003/0208558 A1* | 11/2003 | Venkatraman | H04L 12/2803 709/218 |
| 2004/0005859 A1* | 1/2004 | Ghercioiu | G06F 8/60 455/3.01 |
| 2005/0262092 A1* | 11/2005 | Beartusk | G06F 17/30873 |
| 2006/0179065 A1* | 8/2006 | Xu | G06F 17/30286 |
| 2008/0091954 A1* | 4/2008 | Morris | G06F 21/33 713/187 |
| 2008/0120129 A1* | 5/2008 | Seubert | G06Q 10/06 705/35 |
| 2010/0333064 A1* | 12/2010 | Hattori | G06F 8/20 717/106 |
| 2011/0010692 A1* | 1/2011 | Hattori | G06F 8/38 717/132 |
| 2011/0314439 A1* | 12/2011 | Colgrave | G06F 8/71 717/101 |
| 2012/0239753 A1* | 9/2012 | Beartusk | G06Q 10/10 709/205 |
| 2013/0166490 A1* | 6/2013 | Elkins | G06N 5/02 706/47 |
| 2013/0212215 A1 | 8/2013 | Ukkola et al. | |
| 2014/0109115 A1* | 4/2014 | Low | G06F 9/541 719/328 |
| 2014/0120516 A1* | 5/2014 | Chiang | G09B 5/02 434/362 |
| 2014/0229818 A1* | 8/2014 | Goswami | G06F 17/2247 715/234 |
| 2014/0289366 A1 | 9/2014 | Choi et al. | |
| 2014/0350997 A1* | 11/2014 | Holm | G06Q 10/06316 705/7.26 |
| 2015/0077326 A1* | 3/2015 | Kramer | G06F 3/0325 345/156 |
| 2015/0264423 A1* | 9/2015 | Torgemane | G06F 8/30 715/719 |
| 2016/0179850 A1* | 6/2016 | Martin | G06F 17/303 707/634 |
| 2016/0182327 A1* | 6/2016 | Coleman, Jr. | H04L 41/12 370/329 |
| 2017/0078922 A1* | 3/2017 | Raleigh | H04W 28/10 |
| 2017/0228980 A1* | 8/2017 | Webb | G07F 17/3258 |

OTHER PUBLICATIONS

International Search Report and Written Opinion for PCT Application No. PCT/US2016/026820 dated Jul. 1, 2016, 14 pages.

* cited by examiner

| TYPE | DESCRIPTION | GRAPHICAL DISPLAY |
|---|---|---|
| data-widget | Displays the current value of any linked data item in the target device. The value displayed is automatically updated when the value changes. The data can be displayed as a single value, or a chart of historical values. | |
| device-Info | Shows information about a target device. Includes basic information such as name, network configuration etc. Can also include status, such as online/offline/error. | |
| step-list | Displays a representation of the read cycle as a list of "steps". Each step shows a summary of the settings relevant to its function, and provides appropriate controls to allow the user to change those settings.<br><br>The step list can also display live performance data for each function. This can include symbol decode information and metrics, a success / fail indicator, etc. | |
| ip-image | A display of one or more images that may have image processing data associated with it. The data may include positions and bounds of objects identified within the image, performance data, other graphics, etc. | |

Fig. 13

| EXAMPLE | DEFINITION | DISPLAY |
| --- | --- | --- |
| Display a widget that allows the user to manipulate the exposure setting using a logarithmic range slider. Show a sparkline history of any changes made to the setting. | {<br>"type": "data",<br>"display" : "sparkline",<br>"title": "Shutter",<br>"mslink": "K255.02",<br>"index" : 0,<br>"editor" : "log-range"<br>} | 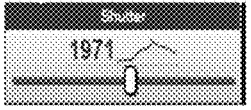 |
| | {<br>"type": "data",<br>"title" : "Total X-Mode Time",<br>"display": "chart",<br>"mslink": "@xmTiming.total",<br>"chartOptions" : {<br>  "xaxis" : {"show" : false}<br>}<br>} | 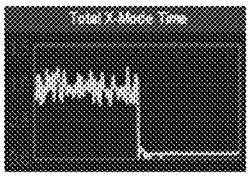 |
| | {<br>"type": "data",<br>"title" : "First Symbol Data",<br>"errorString": "NOREAD",<br>"mslink": "@ipReports[0].xmReport.decode[0].data"<br>} | 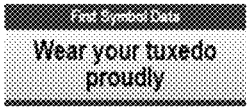 |
| | {<br>"type": "data",<br>"display" : "sparkline",<br>"title": "Testing",<br>"interval" : 100,<br>"default" : "----",<br>"toFixed" : 2,<br>"mslink": "$mockDataService.sin",<br>"css" : {<br>  "display" : "block"<br>},<br>"condition" : [<br>{<br>  "expression" : "value > 0",<br>  "class" : "over"<br>},<br>{<br>  "expression" : "value < 0",<br>  "class" : "under"<br>}<br>]<br>} | When value < 0<br>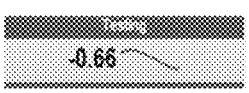<br>When value > 0<br> |

Fig. 14

| ATTRIBUTE | ALLOWED VALUES |
|---|---|
| display | "default" – displays value as fed through default formatters<br><br>"chart" – shows historical data as a chart:<br>"sparkline" – shows the value + a small inline historical chart:<br>1971 |
| editor | "text"<br>"select":<br>"select-range" – uses a select box instead of a range slider. To limit the range of values, use the min and max attributes. In this example, number of symbols is a range from 1-100. Instead of a range slider, the editor is an inline select box:<br>Look for 2 symbols<br><br>Clicking the value results in:<br>Look for [2 ▼] symbols<br>End cyc[ 1 ] about<br>Timeout[ 2 ] ns<br>[ 3 ]<br><br>"bit-field" – uses a multi-selection combo box. Implemented using select2.js This type also depends on extra info being registered for the mslink. Used by the symbology selection.<br>QR code, Codabar,<br>PDF417<br>• QR code<br>• Codabar<br>• PDF417<br><br>Any Code<br>Data Matrix<br>QR Code<br>Code 128<br>Code 39<br>Codabar<br>Code 93<br>2of5<br>UPC<br>PDF417 |

Fig. 15A

| ATTRIBUTE | ALLOWED VALUES |
|---|---|
| editor | "range" – shows a range slider when the value is clicked <br>"log-range" – same a range, but with a logarithmic scale<br>"chararray"<br>"hexarray" |
| format | String - HTML (with directives allowed). A bound version of the current value will be inserted wherever "{value}" appears in the string, and then it will be compiled and inserted into the DOM. |
| index | *Integer* – the index to be used when accessing a parameter array |
| max | *Number* – the maximum value used for the select-range editor type |
| min | *Number* – the minimum value used for the select-range editor type |
| mslinkId | *String* – the mslinkId |
| toFixed | *Integer* – if the value is floating point, the number of decimal places to display |
| valueExpr | *String* – a string that will be run though eval(). The current value will be substituted wherever "value" appears in the string. For example, valueExpr="value * 2" will show two times the normal value. |
| widget | *Object* – A widget definition object. If specified, then this will be used to drive all settings. The individual properties will still be overridden with any attributes specified. |

Fig. 15B

WEB ENABLED INTERFACE FOR AN EMBEDDED SERVER

CROSS-REFERENCE AND PRIORITY CLAIM TO OTHER APPLICATIONS

This application claims priority to and the benefit of the earlier filing date of U.S. Provisional Application No. 62/145,401 entitled Web Enabled Interface to an Embedded Web Server, filed in the United States Patent Office on Apr. 9, 2015, which is herein incorporated by reference.

TECHNICAL FIELD

The present invention relates generally to computer interfaces and in particular, but not exclusively, to a web enabled interface to web services of an embedded server.

BACKGROUND

Modern process control systems, such as data acquisition systems for tracking, tracing and controlling various processes in industries as varied as manufacturing, retailing and shipping, employ devices with embedded servers. The devices typically include 1D or 2D bar-code readers (imagers), bar-code verification and inspection systems, image acquisition devices for machine vision systems, laser scanners, RFID readers and the like.

Improvements in data connectivity allow access to web services provided by the embedded servers from web-enabled devices, such as personal computers (PCs), tablets, smart phones and other human machine interfaces (HMIs) typically used in industrial control automation.

Advances in standardization of web technologies as well as cloud computing technologies provides opportunities to simplify access to web services provided by the embedded servers and increase cross-platform flexibility.

There are, however, certain constraints on devices employing embedded servers as opposed to a dedicated server device, including constraints on memory, storage, bandwidth and CPU cycles. In addition, due to the availability of web access, the demands on the web services provided by the embedded servers is increasing.

Such constraints and increased demand must be taken into account in the design of embedded web servers and web applications for processing the types of complex data typically generated by process control systems employing embedded web servers.

BRIEF DESCRIPTION OF THE DRAWINGS

Non-limiting and non-exhaustive embodiments of the present invention are described with reference to the following FIGS. 1-12, wherein like reference numerals refer to like parts throughout the various views unless otherwise specified.

FIG. 13 is a table showing examples of bindable data items and data bound controls.

FIG. 14 is a table showing example definitions of data-widget types of data bound controls.

FIGS. 15A-15B are tables showing example attributes applied to a view.

DETAILED DESCRIPTION OF THE ILLUSTRATED EMBODIMENTS

Figure 1:
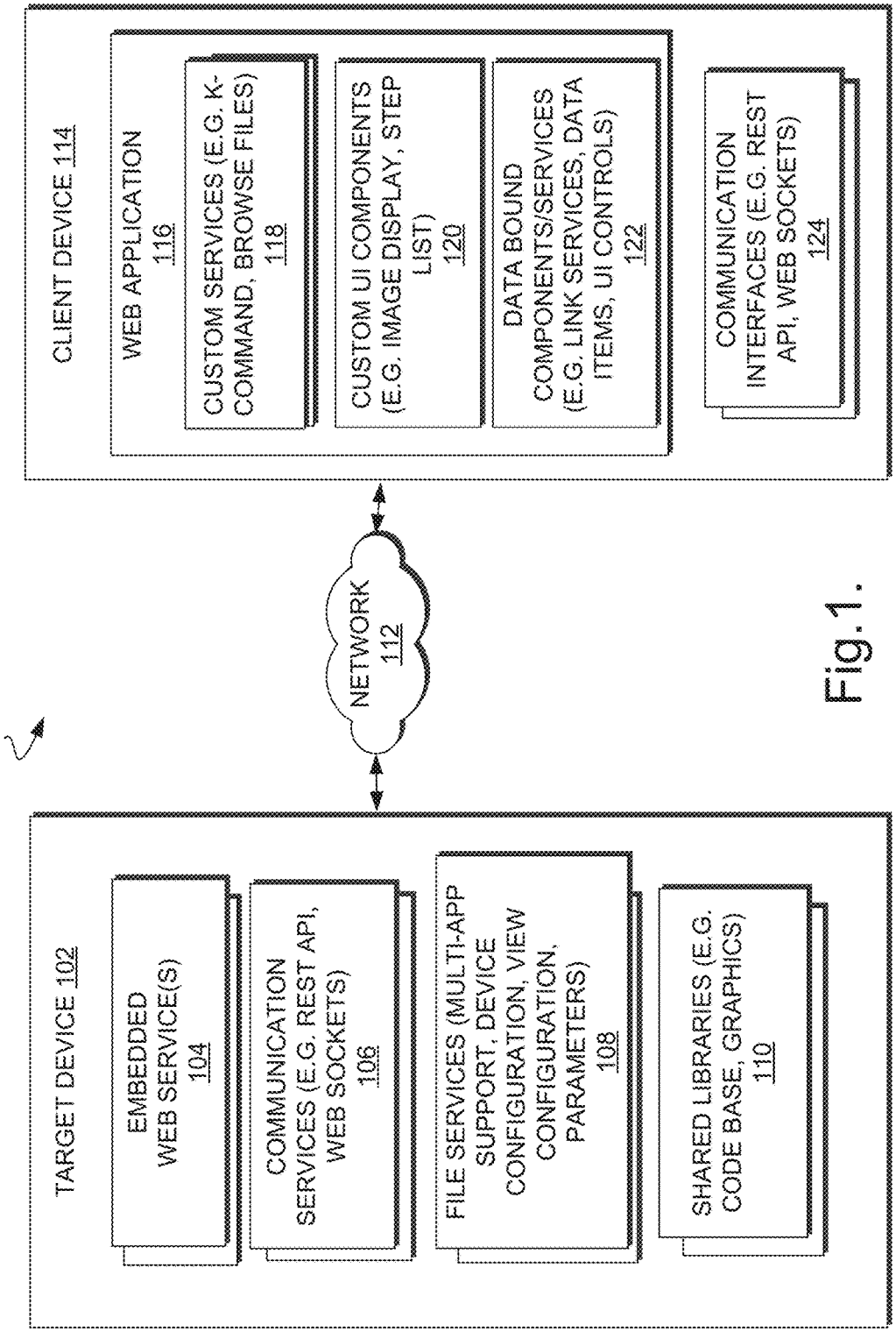
FIG. 1 is a block diagram of an embodiment of a system or framework for a web-based interface to an embedded web server.

Embodiments of a system and method for a web-based interface to an embedded web server are described. Numerous specific details are described to provide a thorough understanding of embodiments of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one described embodiment. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

In the following paragraphs, example embodiments of a system for a universal interface to an embedded server of a data acquisition device are described, in which the system includes, among other components, a web-enabled device in communication with a data acquisition device having an embedded server, a communication service conforming to a web protocol supporting transmission of data between the web-enabled device and data acquisition device, and a web application operating on the web-enabled device, wherein data residing on the data acquisition device is universally accessible using the web application regardless of any one of a location and a type of the web-enabled device. Among other advantages of the described embodiments, data residing on the data acquisition device can be bound to a corresponding object of the web application such that a change to the data is reflected in the object and a change to the object is reflected in the data. In addition, embodiments of the system employ protocols to facilitate on-demand and real-time access to transmitted data, including exchanging data with the web application on demand, and pushing data to the web application in real-time.

In one embodiment, systems, methods and apparatus for a universal interface to an embedded server of a data acquisition device is described in which a web-enabled device, in communication with a data acquisition device having an embedded server, provides a communication service conforming to a web protocol supporting transmission of data between the web-enabled device and data acquisition device and a web application operating on the web-enabled device such that data residing on the data acquisition device is universally accessible using the web application regardless of any one of a location and a type of the web-enabled device.

In one embodiment, the data residing on the data acquisition device is bound to a corresponding object of the web application such that a change to the data is reflected in the object and a change to the object is reflected in the data. One or more web protocols facilitate on-demand and real-time access to transmitted data, including protocols that exchange data between the data acquisition device and the web application on demand, as well as protocols that enable pushing data to the web application in real-time and vice versa.

In one embodiment, the data acquisition device is any one or more of a scanner, reader and image acquisition device and the web-enabled device is any device having a web-based display interface and network access, including any one or more of a stationary computer, a mobile computer, and an HMI device.

In one embodiment, methods, systems and apparatus for a web-based interface to a web server embedded in a data acquisition device is provided in which a connection is established between one or more proxy objects in a web application on the client device and data objects in a web server embedded in the data acquisition device, and the web application configures user interface (UI) components with the one or more of the proxy objects, the UI components representing one or more processes performed on the data objects in the data acquisition device. In one embodiment the web application constructs a view of the one or more processes performed on the data objects in the data acquisition device, the view constructed from the UI components and the values of the data objects in the data acquisition device as reflected in the proxy objects, displays the view in the web application's interface on the client device and synchronizes the data objects with the proxy objects to reflect in the view any changes in the values of the data objects on the data acquisition device.

In one embodiment, configuring the UI components to represent one or more processes performed on the data acquisition device includes combining conceptually related processes performed on the data acquisition device into one or more of the UI components and configuring a high level parameter in one of the UI components to manage multiple parameters on the data acquisition device, the multiple parameters corresponding to data objects connected with proxy objects. In one embodiment, establishing the connection between the one or more proxy objects and the data objects includes requesting on demand from the embedded web server a value object definition of the data object, receiving the value object definition from the embedded web server using a data exchange protocol, and linking one or more proxy objects to one or more data objects based on the value object definition, wherein linking includes resolving symbolic identifiers in the value object definition.

In one embodiment, the UI components include any one or more of a device info to display information about the data acquisition device, a data widget for displaying values of data objects, a step list processing data objects containing a cycle report generated in the data acquisition device, and an ip-image controlling the display of data objects containing one or more images acquired by the data acquisition device and referenced in the cycle report. In one embodiment, the cycle report and images are received asynchronously and correlated for display in the view on the client device, including parsing the cycle report to obtain information related to the one or more images, including a list of unique IDs of the one or more images, fetching the one or more images using the list of unique IDs, and combining the one or more images with information in the cycle report.

In one embodiment, the ip-image UI component for controlling the display of data objects containing the one or more images fetched using the list of unique IDs operates in any one or more modes including a single image mode to display a single image, a multiple image mode to configure multiple images for display along a time axis, a time scale mode to scale an image width to represent an acquisition time and to position each image of the multiple images to represent a delay in the acquisition time, the delay represented as a gap between the multiple images and a time control mode to superimpose on the display of the images one or more timing signals parallel to the time axis.

In one embodiment, responsive to the display revealing irregular positioning of the multiple images indicative of a timing error, the ip-image UI is configured to receive an input from a user of the client device to adjust a high level parameter in the ip-image UI component which, in turn, causes the data acquisition device to adjust one or more actual parameters to correct the timing error. Additional input can be received from the user to repeatedly adjust the high level parameter to correct the timing error until the irregular positioning revealed in the display is substantially eliminated.

In one embodiment, the display of multiple images is arranged in rows and columns, each row of the display representing a single data acquisition cycle and the irregular positioning indicative of the timing error is multiple images misaligned in the columns indicative of timing jitter, and in which the ip-image UI component is configured to receive additional input from the user to repeatedly adjust the high level parameter to correct the timing jitter until the multiple images in the columns are aligned.

In one embodiment, establishing the connection between the data objects and the proxy objects is performed using a first communication channel for communicating with the client on demand, and synchronizing the data objects and the proxy objects includes transmitting the value object definition to the client on demand using the first communication channel, and pushing change in value notifications about changes to the data objects to the client as needed using a second communication channel different from the first communication channel. In one embodiment the second communication channel is a web socket connection established between the client device and the data acquisition device, and the web application is configured to apply the change notification to the proxy object to reflect the changed value of the data object. In one embodiment, the web application constructs the view based on a view definition file received from a user of the client device, the view definition file customizing the view in accordance with the user's requirements.

In one embodiment, methods, systems and apparatus are described for a web server embedded in a data acquisition device that has a processor for performing an acquisition process in response to a trigger to acquire data captured during a processing cycle. The processor performs web services to provide access to the acquired data for one or more client devices, and the processor is configuring to enhance access to the acquired data while minimizing disrupting the processing cycle, including performing a data process that generates data related to the acquired data captured during the processing cycle, correlates data related to the same processing cycle, and accumulates the correlated data for access by a client device, provides multiple communication channels for transmitting data to and from the client devices, and responds to requests from the client devices for access to any one or more of the acquired data, generated data, correlated data and accumulated data using different communication channels while minimizing disrupting the processing cycle.

In one embodiment, accumulating the correlated data for access by the client includes, generating a data bundle containing a cycle report referencing data captured during the processing cycle and information for controlling a view of the referenced data in a display on the client device and storing the data bundle for subsequent access by the client. In one embodiment, the processor is configured to transmit the cycle report referencing data captured during the processing cycle to the client unconditionally at the end of the processing cycle and/or to transmit the data bundle to the client on demand.

In one embodiment, correlating data related to the same processing cycle includes generating historical data of any one or more of parameters and performance information in effect during the processing cycle and storing the historical data for subsequent access by the client, including transmitting the stored data bundle and historical data to an intermediary storage server for any one of access by the client on demand or for serving to any one or more interested clients after transmitting is completed.

In one embodiment, the processor maintains a default hierarchical priority level for performing, in order of priority from high to low, the acquisition process, an event acknowledgement process, the data process, and an event handling process. During operation, the processor is configured to receive any one or more asynchronous events from any one or more clients requesting data from the data acquisition device and to determine whether to prioritize the event handling process over the data process depending on any one or more of a type and frequency of the asynchronous events. Upon determining that prioritizing the event handling process over the data process can be performed without substantially disrupting the acquisition and data processes, the processor is configured to temporarily handle the asynchronous events with higher priority. Upon determining that prioritizing the event handling process over the data process cannot be performed without substantially disrupting the acquisition and data processes, the processor is configured to revert to the default hierarchical priority level.

In one embodiment, at least one non-transitory computer-readable storage medium includes instructions that, when executed on one or more processors of any one or more of the aforementioned target devices, data acquisition devices, process control devices, client devices, servers and web enabled devices cause the processor(s) to perform any one of the methods and systems herein described.

FIG. 1 is a block diagram of an embodiment of a system or framework 100 for a web-based interface to an embedded web server. System 100 includes a target device 102, such as a machine vision camera or other data acquisition device, in communication with a client device 114 over a communication network 112, such as an Ethernet, TCP, HTTP or other such communication network, including an internetwork such as the Internet.

In one embodiment, the target device 102 provides embedded web services 104 to allow web-enabled devices, such as client device 114, use network 112 to access a set of web pages or web applications that process and/or display the data generated by the target device.

The target device 102 further provides communication services 106, such as a REST API (Representational State Transfer application programming interface) and a web socket interface. The REST API allows a client device 114, including a web application 116 on the client device, to call functions residing on the target device 102. The functions can return data files residing on the target device 102, including data representing images acquired by the target device 102.

In one embodiment, the web socket interface provides a TCP (Transmission Control Protocol) socket-type of connection between web-enabled devices, such as the devices 102 and 114, and web services 104 and web applications 116 as will be described in further detail. The web socket-type of connection allows the target devices 102 to push data in real-time to a web application 116 operating on the client device 114.

In one embodiment, the target device 102 further provides file services 108 and shared libraries 110. The file services and shared libraries support access to the target device's configuration and configuration parameters, as well as access to the shared libraries of code and graphical assets by one or more web applications.

The target device 102 is typically a special-purpose device such as a camera, scanner or other type of data acquisition and/or process control device. The target device 102 could also include a 1D or 2D bar-code reader (imager) or verification and inspection device, image acquisition devices for machine vision systems, laser scanners, RFID readers and the like. In the context of image acquisition devices for machine vision systems, the target device 102 can include machine vision cameras, such as a smart camera or other cameras having connectivity to a machine vision system.

The client device 114 is typically any web-enabled device, ranging from a stationary desktop computer or other HMI device having a browser interface and network or Internet access to any one of a variety of mobile devices having a browser-based display interface and network access, such as smart phones, laptops, tablets and PDAs.

The client device 114 is typically configured with a web application 116 that allows the client device 114 to access the embedded web services 104 of the target device 102. In particular, the web application 116 provides custom services 118 and user interface (UI) components 120 that allow users of the client device 114 to view, monitor and/or control processes being performed by the target device 102.

To support the custom services 118 and UI components 120, the web application 116 further provides data bound components/services 122 to facilitate binding the data objects in the web application 116 with the corresponding data items or controls in the shared libraries 110 used by the embedded web services 104 and file services 108 on the target device 102.

The client device 114 is further provided with various communication interfaces 124 that support the communication protocols used by the corresponding communication services 106 of the target device 102 to transmit data, including binary data and text data.

Figure 2:
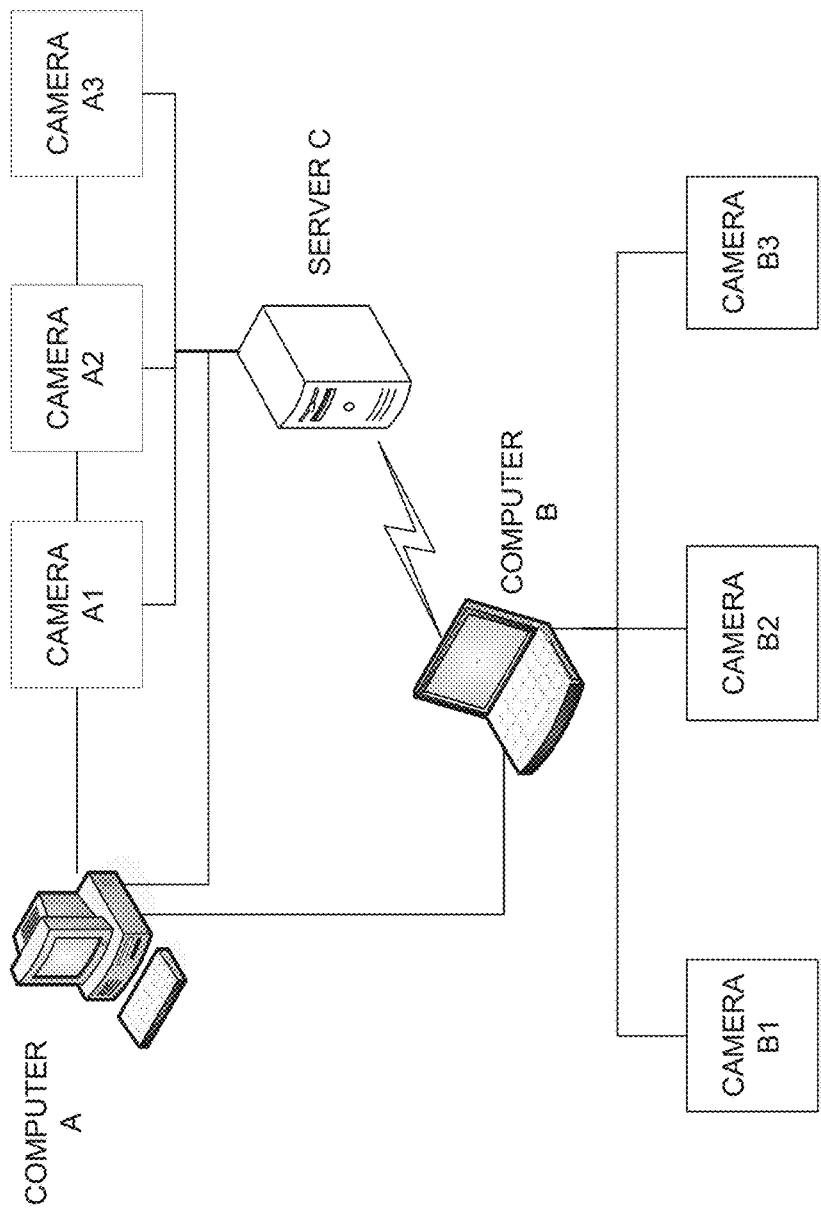
FIG. 2 is a block diagram of an embodiment of a typical operating environment for a data acquisition system supporting a web-based interface to an embedded web server as in FIG. 1.

FIG. 2 illustrates a typical operating environment for an embodiment of a data acquisition system 200 supporting a web-based interface to an embedded web server as in FIG. 1. Target devices, such as machine vision cameras A1-A3 or other types of data acquisition devices, such as scanners, are coupled in a daisy-chain configuration to computer A, and machine vision cameras B1-B3 coupled in a bus configuration to computer B, such as a laptop computer. Computer A is coupled to computer B by a communication link, such as an Ethernet, TCP, HTTP or other such connection. Server C, such as a server computer functioning as an intermediary network-accessible server C to facilitate communication between any one or more of computer A, computer B, cameras A1-A3 and B1-B3, is coupled to both the cameras and the computers by a communication link, such as an Ethernet, TCP, HTTP or other such connection.

In different embodiments, the computers may operate in a stand-alone configuration with a connection to one or more machine vision cameras and a server computer in a data acquisition system. The communication link between components in operating environment can be hard-wired, wireless, or some combination of the two. In particular, a mobile computer, such as Computer B, may be in communication with the other components of the system using a connection to the Internet or through a wireless access point to the communication link.

In the context of a data acquisition system 200 the data generated by barcode scanners and cameras is typically produced in a cyclical manner, and ranges from simple decode strings to more complex data such as calibrated measurements and sets of images captured by the camera. Each "read cycle" or "inspection cycle" generates a "cycle report" containing related information about the operation of a single cycle.

For example, among other information, a read cycle could contain the decoded output string(s), timing information, positional information (which can be used for drawing graphics). Both scanners and data acquisition systems employing cameras also process images, which represent very useful information on their own.

In a typical operation of a scanner or camera in a data acquisition system, a single cycle report may be related to multiple images. The images may also be quite large. Therefore, it may not be possible to transmit the image information from the target device 102 to the client device 114 at the same time or using the same transmission means as is used to transmit the cycle report. In particular, web connections over network 112 support communication services 106 and communication interfaces 124 that are typically geared towards one type of data (i.e. binary or text) or the other, but not both. This can result in the transmission of two different data streams related a single cycle report; one for the report data, and one for the image(s).

Because the two different data streams are typically transmitted asynchronously, they need to be correlated in order to, for example, display an overlay on an image based on information from a cycle report. In one embodiment of the embedded web server on target device 102, the cycle report data for generating the overlay may be pushed to client device 114 via a web socket 106, such as described using the data synchronization services described in further detail in FIG. 6, whereas the image data itself needs to be requested at regular intervals to refresh an HTML <img> tag corresponding to the display of that image.

For instance in the overlay example, the embedded web server 104 on target device 102 generates a cycle report containing a list of unique IDs (UIDs) for each image used in generating the cycle report. The images themselves are buffered, either for a limited time on the target device 102, or for a longer duration on the client device 114 or other device accessible to the target and client devices. After the web application 116 has received and parsed the cycle report, the corresponding image data representing the image(s) is fetched by using the UID as part of an image source URL (uniform record locator) that references to corresponding image data transmitted from the target device 102. The corresponding overlay data to overlay the images is correlated to the image data. In this manner, the web application 116 operates in conjunction with the embedded web services 104 to correlate the overlay and image data transmitted from the target device 102 to the client device 114, as necessitated by the limitations of the available communication channels between the devices.

In order to access data efficiently, the informational data generated by the camera that acquired the image data may be packaged and sent to a web application on the client using a standard communication protocol. For example, in one embodiment, during a camera's read cycle, the embedded web server packages information about the acquired images and/or data into a read cycle report and transmits the report to the client device 114 using a standard communication protocol provided by the communication services 106 of the target device 102.

In one embodiment, for certain target 102 and client 114 devices, a read cycle report generated by the target 102 is packaged using XML (extended markup language) or other standard data protocol and transmitted to the client 114 over a web socket interface supported by the devices' respective communication service/interface 106/124. Upon receipt by the client 114, the web application 116 processes the data contained in the read cycle report by referencing the tags and attributes of the XML read cycle report back to corresponding data on the target device 102.

In one embodiment, the data referencing is performed in the client device 114 using the client's data bound component services 122 of web application 116 in communication with the corresponding file services 108 and communication services 106 that support the embedded web services 104 on the target device 102. In one embodiment, the data referencing functions may be implemented as a link service as described in further detail with reference to FIG. 5.

Figure 3:
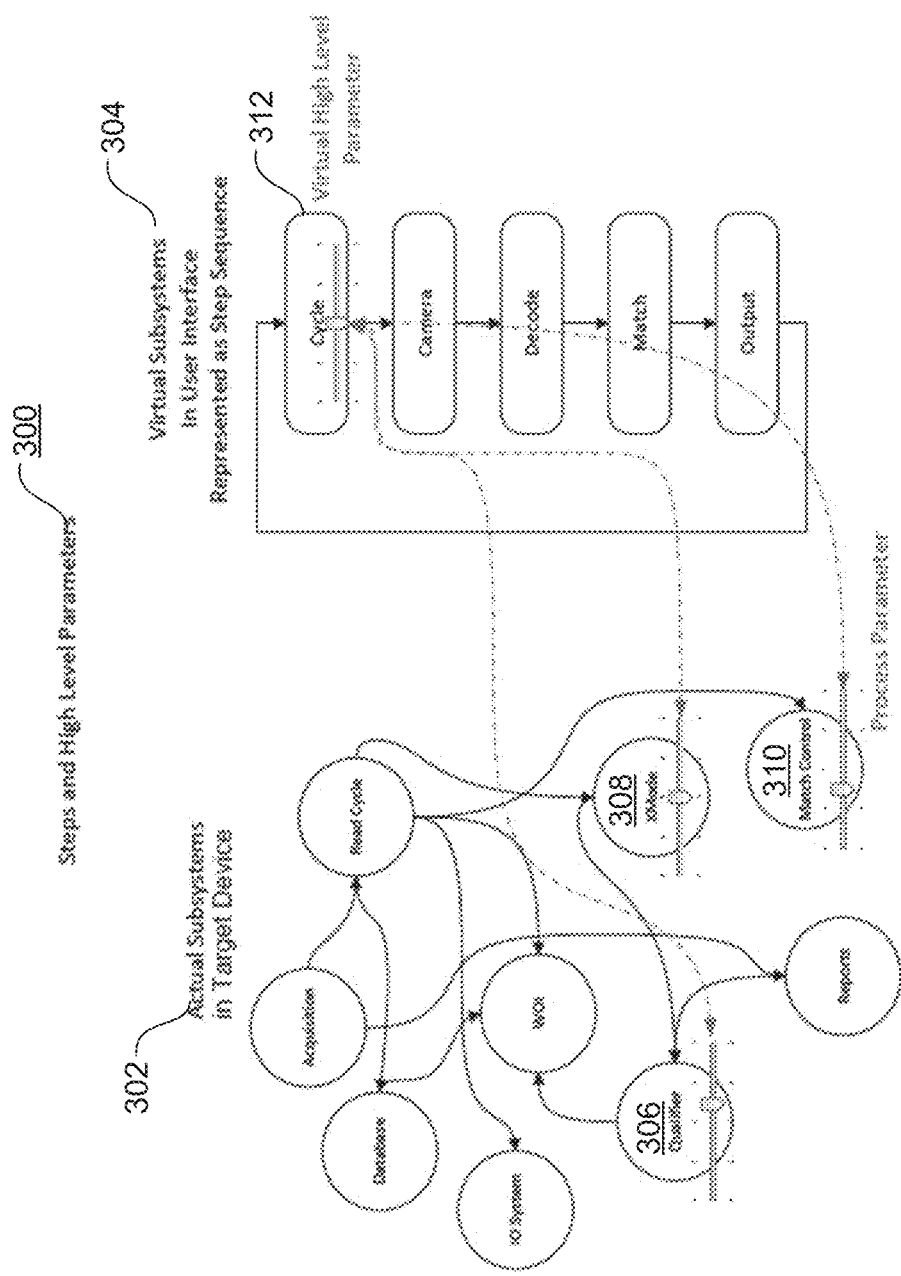
FIG. 3 is a block diagram of an embodiment of selected subsystems for a data acquisition system supporting a web-based interface to an embedded web server as in FIG. 1.

FIG. 3 illustrates an embodiment of selected subsystems for a data acquisition system supporting a web-based interface to an embedded web server as in FIG. 1. For example, the target device 102 can contain numerous actual subsystems that are complex and operate non-sequentially and non-intuitively from the vantage point of a user of the web application 116 user interface on the client device 114. To provide more efficient access to the data and information generate by the target device 102, in one embodiment, the web application 116 is configured to convert the non-intuitive and non-sequential flow of control into a linear logical control flow. In the illustrated example, the linear logical control flow is embodied in the virtual subsystems represented as a logical step list or step sequence 304, including a cycle step, a camera step, a decode step, a match step and an output step.

In one embodiment the any one or more steps in the step list 304 can be configured to generate a virtual high level parameter from multiple process parameters used in the actual subsystems of the target device 102. By way of example only, in FIG. 3 a virtual subsystem 304 represents a read cycle where a single high level cycle parameter exposed to the user interface corresponds to three process parameters controlling the operation of the target device 102, specifically the qualifier parameter 306, the Xmode parameter 308 and the match control 310 parameter. In other embodiments, the virtual subsystems of the web application 116 on client device 114 could include other high level parameters corresponding to different process parameters controlling the operation of the target device 102.

Figure 4A:
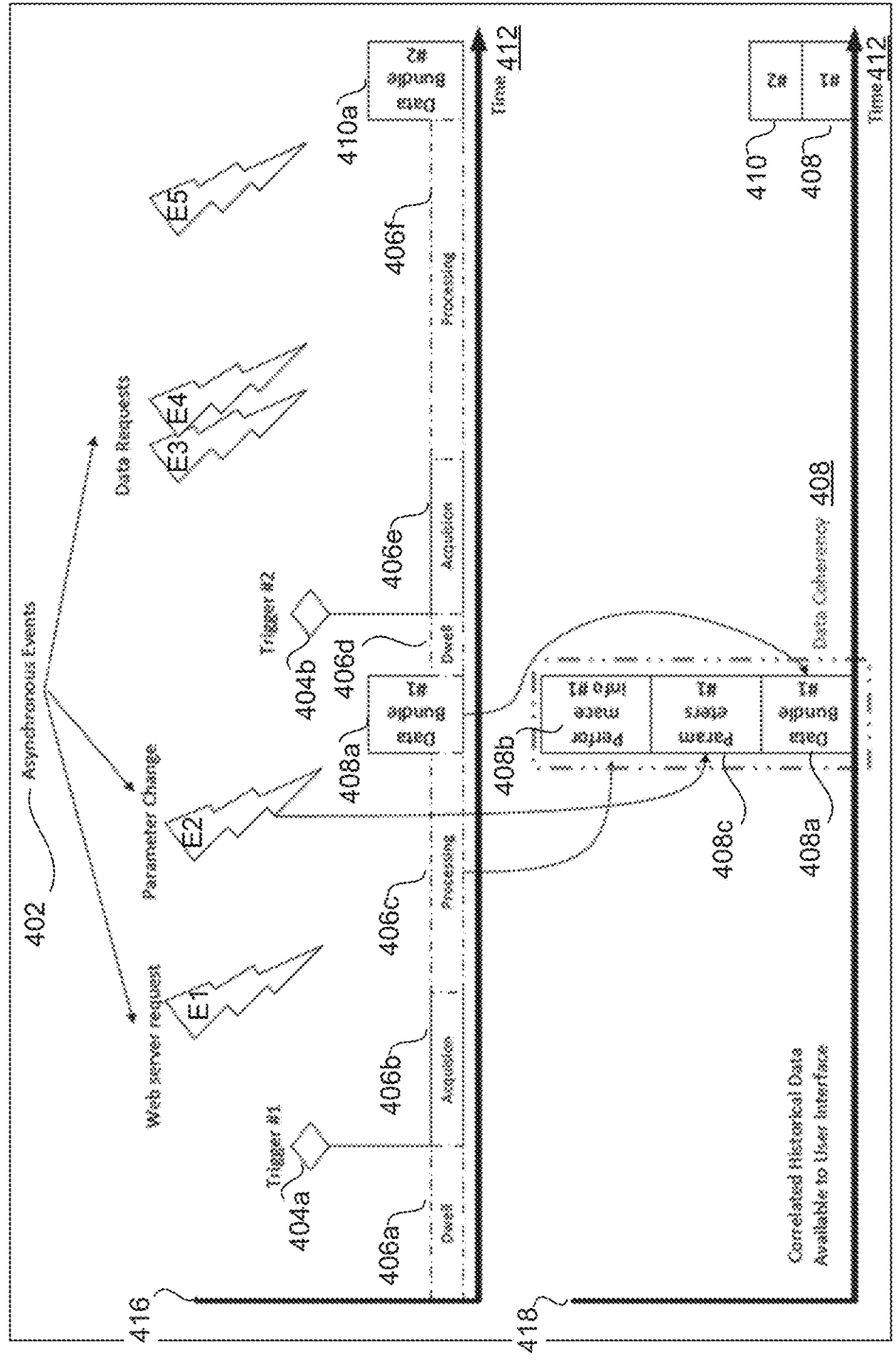
FIGS. 4a-4b illustrate an overview of an embedded web server operating environment and an embodiment of processes for supporting a web-based interface to an embedded web server in such an operating environment.
Figure 4B:
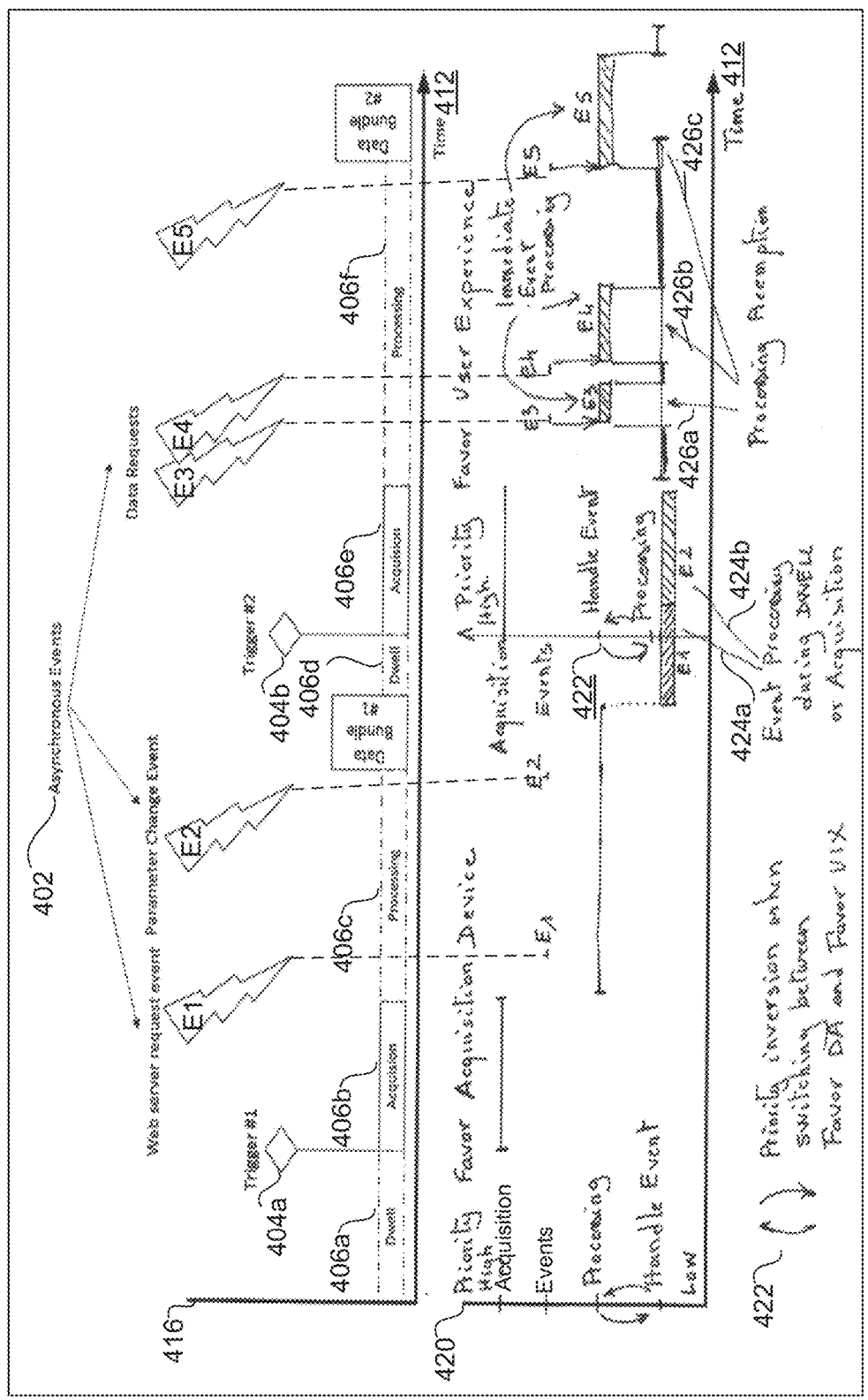

FIGS. 4a-4b illustrate an overview of an embedded web server operating environment and an embodiment of processes for supporting a web-based interface to an embedded web server in such an operating environment. As noted earlier embedded web servers operate under certain constraints on memory, storage, bandwidth and CPU cycles. Moreover, due to the availability of web access, the demands on web services provided by an embedded server is increasing. The operating scenario 400 in FIGS. 4a-4b illustrates typical demands placed on an embedded web server in a data acquisition target device 102.

In accordance with one embodiment, FIG. 4a further illustrates a process 418 on the target device 102 for generating correlated historical data for a web application 116 user interface of a client device 114. As will be explained in further detail in this application, the correlated historical data can be particularly useful for testing the web application 116 and target device 102 under controlled operating conditions, or for use during setup, or for optimizing the timing and other parameters controlling the operation of the target device during the data acquisition cycle.

In accordance with one embodiment, and FIG. 4b further illustrates an embodiment of a process 422 on the target device 102 for adjusting thread priorities to enhance the responsiveness of the embedded web server 104 and web application 116 during tasks such as setup and testing.

With reference to FIG. 4a, during embedded web server processing 416, five different asynchronous events 402 representing a web server request E1, a parameter change E2, and three different data requests E3, E4 and E5 occur at various points over the course of a data acquisition timeline 412. The events typically represent the external requests originating from the web application 116 user interface (UI) client 114 requesting access to data acquired and/or generated by the target device 102.

In addition, two different triggers, trigger #1 404a and trigger #2 404b, each represent an event on the target device 102 itself that triggers the target device to commence processing of respective data acquisition cycles 406a-c and 406d-f. Each data acquisition cycle is characterized by the end of a preceding dwell period 406a/406d of variable duration, followed by an acquisition period 406b/406e of fixed duration, followed by a processing period 406c/406f of variable duration. Each data acquisition cycle ends with the generation of a data bundle 408a/410a, after which the target device 102 enters another dwell period until the next trigger occurs.

In one embodiment, the embedded web server 104 of target device 102 generates correlated historical data 418 comprising the data bundle 408a generated at the end of the data acquisition cycles 406a-c and any corresponding performance information 408b and parameters 408c in effect during time 412 of the data acquisition cycle. In this manner the embedded web server 104 of target device 102 provides data coherency 408 to the web application 116 that is receiving the data bundle 408a. Data coherency 408 is useful for setup, testing and optimizing the operation of the target device 102.

In the illustrated embodiment, the process of generating correlated historical data 418 is repeated for the next data bundle 410a generated at the end of data acquisition cycle 406d-f and any corresponding performance information 410b and parameters 410c in effect during time 412 of the data acquisition cycle. The coherent data 408/410 can be accumulated and stored on the target device 102 for a limited time and transmitted to other devices in communication with the target device 102, including the client device 114, for longer term storage and availability to the client device 114 web application 116.

FIG. 4b illustrates the same operating scenario as in FIG. 4a, and further illustrates an embodiment of a process 422 on the target device 102 for adjusting thread priorities to enhance the responsiveness of the embedded web server 104 to the web application 116 during tasks such as setup and testing or during normal operation.

In one embodiment, the target device 102 is configured with hierarchical levels of priority in order from high to low for acquisition processes, i.e. image acquisition or other data acquisition, acknowledging events, including external asynchronous events 402 and trigger events 404a/404b, data processes for processing images and/or other data acquired or received by the target device 102 and processes for handling the aforementioned events.

In a typical embodiment, the default hierarchical level of priority necessarily favors the acquisition target device 102 by satisfying the acquisition and event acknowledgement processes above the data processing and event handling processes. This is necessary because the target device 102 cannot delay data acquisition due to the temporal nature of acquisition, i.e. the target device 102 only has one window of opportunity to acquire an image or obtain data. The same is true of event acknowledgement which must be performed at the time the event is received.

In one embodiment, however, an adjusted hierarchical level of priority can temporarily favor the client device 114 by inverting the level of priority of the data processing and event handling processes under certain conditions.

For example, as illustrated in FIG. 4b, after completing acquisition process 406b in response to trigger #1 404a, and after acknowledging two asynchronous events 402, a web server request event E1 and a parameter change event E2, the target device 102 begins the usual delayed processing of event E1 during the dwell period 406d. Thereafter, in one embodiment, the target device determines either explicitly, from information provided by the client 114 or other user, or implicitly, from the type of asynchronous events 402 that have been thus far acknowledged, that the user experience should be temporarily favored over the data processing processes.

For example, an explicit determination may be the result of receiving data that the client is performing a setup sequence in advance of data acquisition. Alternatively, an implicit determination may be the result of receiving a sequence of events that implies that the client is performing a setup or test sequence in advance of data acquisition. Either way, upon making the determination, the target device performs the priority inversion process 422 to temporarily elevate the priority level of the handle event processing above the priority level of data processing.

As a result of performing the priority inversion process 422, in one embodiment, the target device 102 now temporarily favors the client device 114 and user experience by continuing to process events E1 and E2 even though a second trigger#2 404*b* is received. The target device 102 simultaneously completes the processing of events E1 and E2 while performing the second acquisition process. After acknowledging a third event E3, fourth event E4 and fifth event E5, the target device 102 immediately processes each of the events and preempts the data processing processes that would have otherwise taken priority. Thus, instead of waiting to process the data request events E3, E4 and E5 until the next dwell period (after generating data bundle #2), the target device 102 is able to respond to the requester (i.e. one or more clients 114 and web applications 116) with the requested data for events E3, E4 and E5 immediately.

In one embodiment, by temporarily favoring one or more client devices 114 the embedded web server 104 of the target device 102 is able to be more responsive to one or more client devices 114 without negatively impacting the acquisition and event acknowledgement processes, which necessarily must always remain at the highest priority levels since they cannot be delayed.

Figure 5:
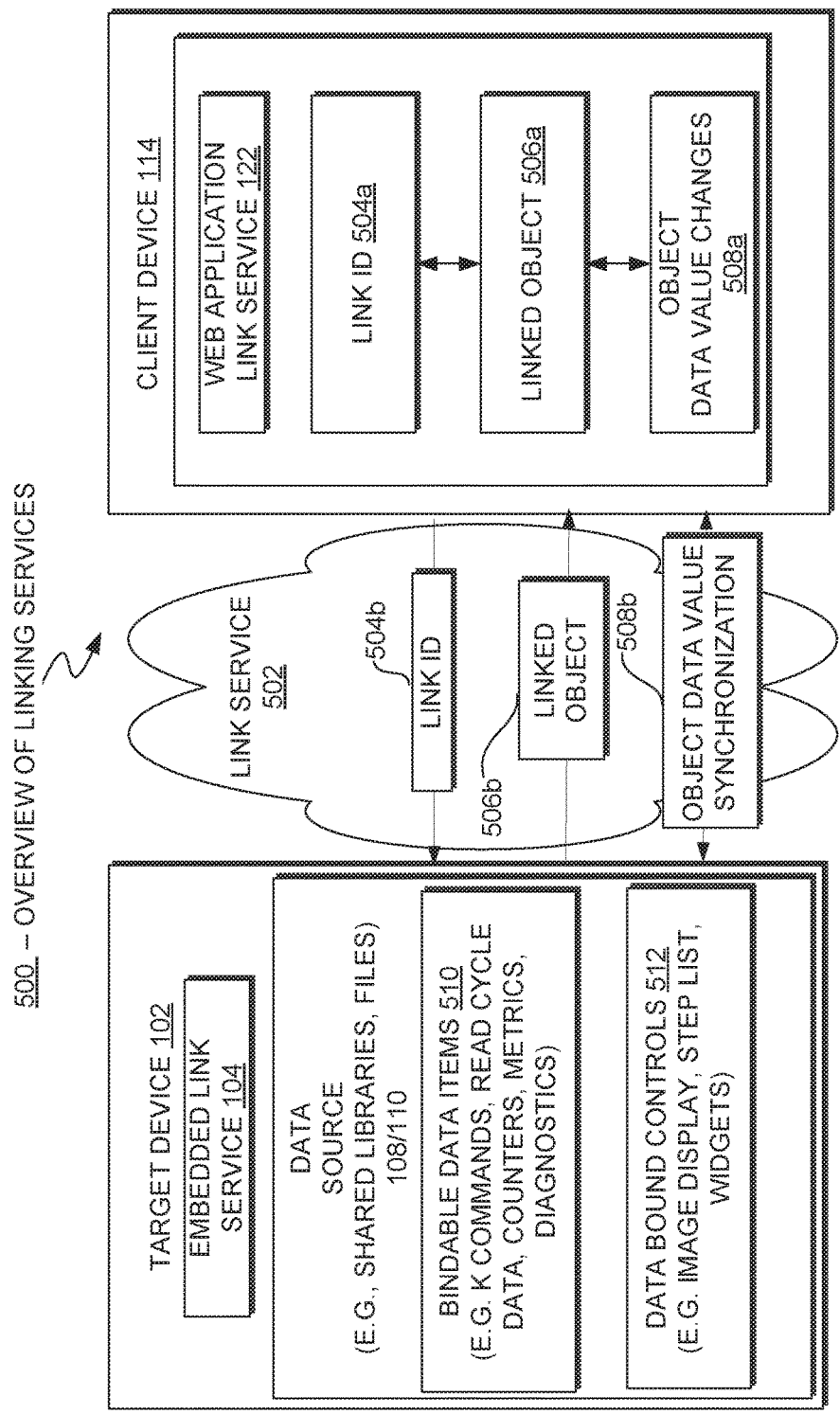
FIG. 5 is a block diagram of an embodiment of communication services for a data acquisition system supporting a web-based interface to an embedded web server as in FIG. 1.

FIG. 5 illustrates an overview 500 of an embodiment of selected communication services for a data acquisition system supporting a web-based interface to an embedded web server as in FIG. 1. The communication services include a link service 502 that interoperates between a target device 102 and a client device 114 over the network 112. In one embodiment the link service 502 may be implemented as an intermediary service on shared server in communication with both the target 102 and client 114 devices.

The link service 502 supports an embedded server link service 104 deployed on the target device 102, and a corresponding web application link service 122 deployed on the client device 114, in which a symbolic identifier, link ID 504, may be used to reference a linked object 506*a*/506*b* in order to perform object data value synchronization 508*a*/508*b* between the linked object's data value 506*b* on the target device 102 and the linked object 506*a* in a uniform manner, regardless of the data source 108/110. In one embodiment, the object data value synchronization 508*a*/508*b* is performed by automatically transmitting/pushing to the client device 114 any object data value changes 508*a* originating from the target device 102, and vice versa. An example of object data value synchronization is described in further detail with reference to FIG. 6. The linked object 506 on the client device 114 corresponds to a bindable data item 510 or data bound control 512 resident on the target device 102.

Among other advantages, in the context of a data acquisition system, the link service 502 operates in conjunction with the web application 116 on the client device 114 to facilitate remote monitoring of active inspections performed by the data acquisition system's target device 102 cameras in real-time.

For example, the above-described cycle reports are converted into linked objects 506 upon receipt at the client device 114. The cycle report itself is represented as a linked object 506, as are any of the referenced data items within the cycle report.

In one embodiment, bindable data items 510 and data bound controls 512 to which the linked objects 506 correspond include but are not limited to the aforementioned read cycle reports, K-commands (scanner configuration commands), counters, metrics, diagnostic data, images and various types of widgets for image display controls, step list display controls, data and device information display controls. Further details of exemplary bindable data items 510 and data bound controls 512 to which the linked objects 506 correspond are listed in FIG. 13.

In one embodiment, the bindable data items 510 and data bound controls 512 are defined not only by specifying the type of the item or control, but also by supplying attributes, such as the title and display format that define the display of the item or control. In addition, the link service is specified, such as the link service 502 described above with reference to FIG. 5.

FIG. 14 illustrates example embodiments of definitions for a data bound control 512, such as a widget, that displays a bindable data item 510 referenced using the link service 502. In the illustrated examples, the link service 502 is triggered when the web application 116 encounters the identifier "mslink" followed by a symbolic identifier. The symbolic identifier is an identifier that has been previously associated with a corresponding bindable data item 510 or control 512 on the target device 102 so that it can be accessed in a uniform manner, regardless of the data source 108/110. Each of the example definitions result in data-bound components 122 for the corresponding bindable data item 510 and/or data-bound control 512.

Figure 6:
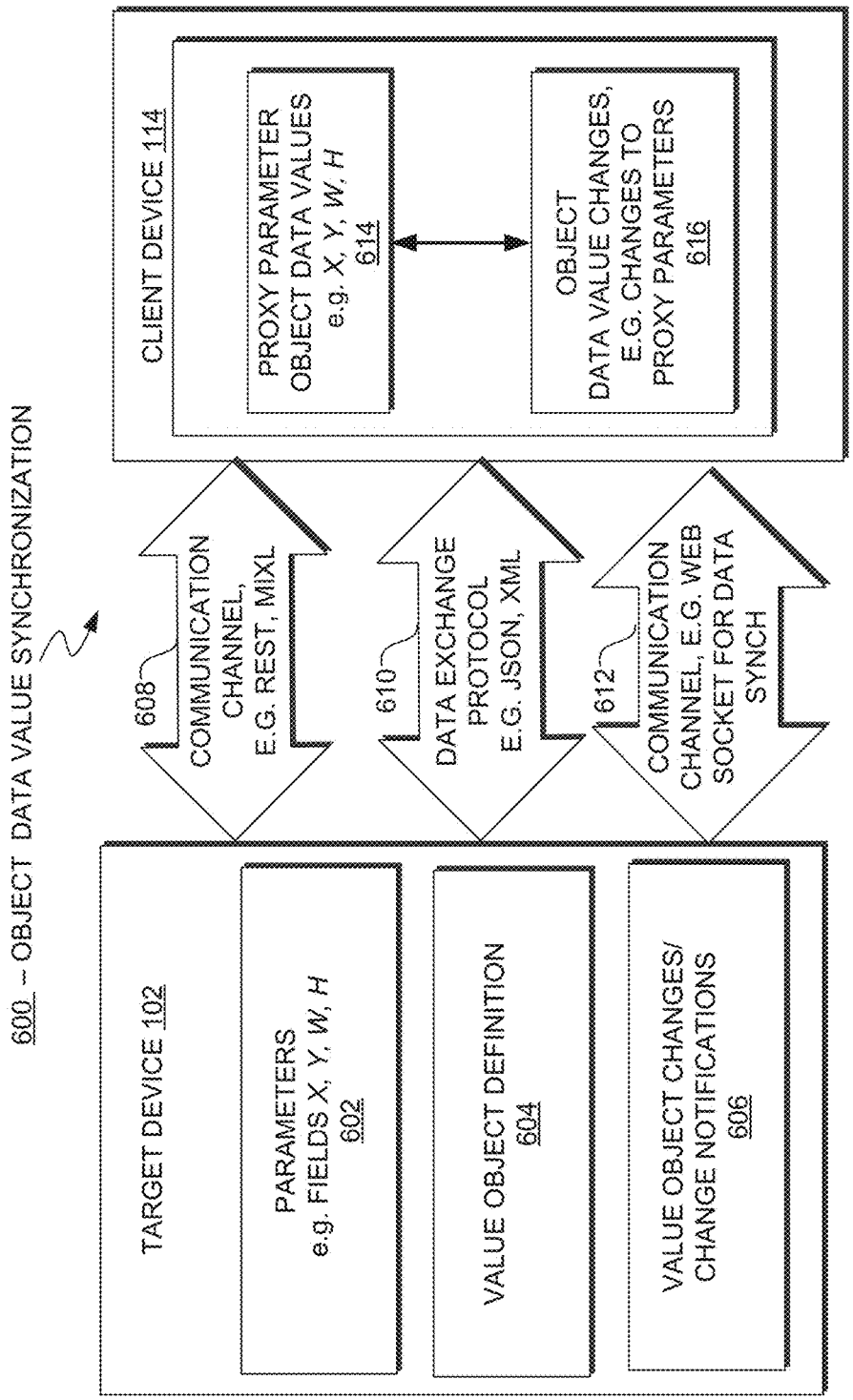
FIG. 6 is a block diagram of an embodiment of object data value synchronization services for a data acquisition system supporting a web-based interface to an embedded web server as in FIG. 1

FIG. 6 is a block diagram of an embodiment of object data value synchronization service 600 for synchronizing the parameters 602 on target device 102 with corresponding proxy parameters 614 on client device 114 for a data acquisition system that supports a web-based interface to an embedded web server as in FIG. 1. The description is for parameters by way of example only; the synchronization processes for service 600 could, of course, be used to synchronize any data objects having a value object definition on target device 102 with corresponding proxy objects on client device 114.

In one embodiment, at least two communication channels 608 and 612 are established between target device 102 and client device 114. In addition, both the target device 102 and client device 114 are configured to exchange data in accordance with a standard non-proprietary data protocol, such as JSON or XML. In the illustrated embodiment, the web application on the client device 114 requests a value object definition 604 for a set of parameters, X, Y, W, and H using the first communication channel 608, using a REST or MIXL request. In response, the target device 102 transmits over a second communication channel 610 to the client device 114 the value object definition 604 using a standard data exchange protocol such as JSON or XML.

In one embodiment, upon receipt of the value object definition 604, the web application 116 on the client device 114 can then generate a viewport or other UI component for displaying the proxy parameter object data values 614 as described in FIG. 5 and as will be further described with reference to FIG. 7. Upon display, the object data values 614 reflect the actual values of the parameter fields 602 on the target device 102.

In one embodiment, the target device 102 generates change notifications about any value object changes 606 in the values of the parameter fields 602. Using a separate communication channel 612, the target device 102 can then efficiently push the change notifications 606 to any client devices 114 that have requested the value object definitions 604 for parameter fields 602 to make sure that the latest values of the parameters on the target device 1-2 are reflected in the client device 114 web application 116 UI in real-time or near real-time.

Figure 7:
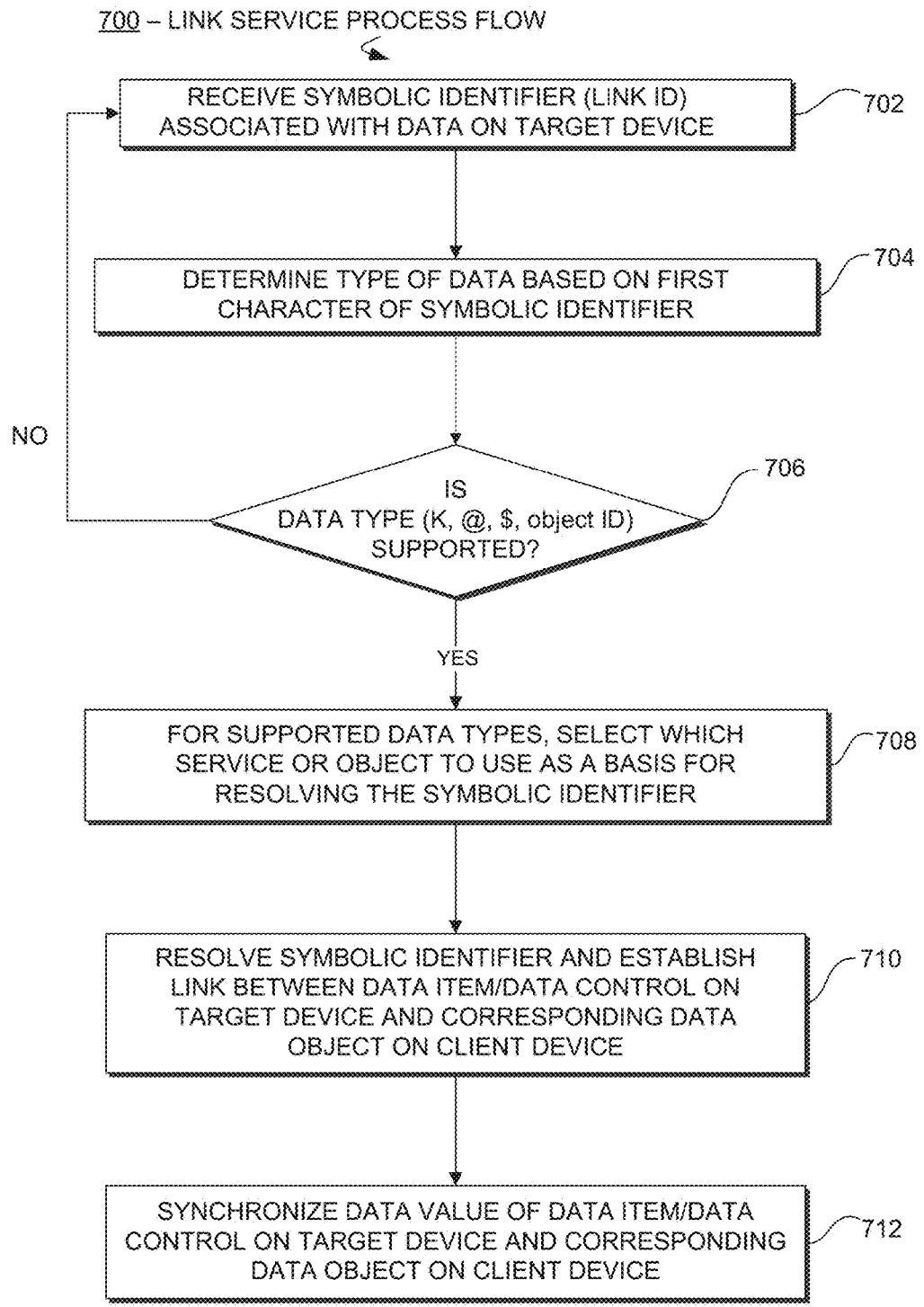
FIG. 7 is a flowchart illustrating an embodiment of a process for a data acquisition system supporting a web-based interface to an embedded web server as in FIG. 1.

FIG. 7 illustrates an embodiment of a link service process flow 700 for a web-based interface to an embedded web service as described in FIG. 1. Among other functions the link service process 700 resolves a symbolic identifier previously associated with data on the target device 102 so that it can be accessed in a uniform manner, regardless of the data source 108/110. The process 700 begins with receiving the symbolic identifier at 702. In one embodiment, the process 700 also receives an object identifier at 702, wherein the object identifier is used to resolve the symbolic identifier.

Table 1 summarizes the different types of data that can be represented by a symbolic identifier in one embodiment.

TABLE 1

Example data types represented by symbolic identifiers

| DATA ITEM | INITIAL CHARACTER OF SYMBOLIC ID | EXAMPLES |
|---|---|---|
| Parameter | K | K255.02 |
| Item within the latest cycle report | @ | @ipReports[0].xmReport.decode[3].data<br>@memInfo.avail<br>@xmTiming.total |
| Item within any angular service | $ | $mockDataService.sin<br>$targetInfoService.targetIpAddr<br>$readCycleReportService.connection.counters.totalCycles |
| Item within an object | ID is used directly against supplied object | If an object {foo:23} is passed in to resolve( ), then using mslinkId="foo" will resolve to 23, where mslinkId invokes the link service that resolves the symbolic identifier |

The symbolic identifier is composed of a string, and at 704, the process 700 determines the type of data represented by the symbolic identifier based on the first character of the string. Therefore, in one embodiment, using the example data types listed in Table 1, a symbolic identifier with a "K" in the first character of the string represents a parameter for a "K" command; a "s" represents an item within the latest cycle report generated by the target device; and the "$" represents an item within a reusable and self-contained piece of code.

In one embodiment, process 700 continues at decision 706 to identify supported data types, and at 708 to select which service or object to use as the basis for resolving the symbolic identifier of the supported data types.

In one embodiment, when the symbolic identifier contains the "$" the process 700 is typically also in receipt at 702 of the aforementioned object identifier, or object ID. It is this object that contains the reusable and self-contained piece of code within which the represented item is contained. The process 700 locates the represented item by matching the remaining string of characters against the names of items contained in the object.

In one embodiment the named object, or object ID, that contains the reusable and self-contained piece of code is defined as a service component of the AngularJS development framework, and is referred to as an Angular service.

For example, in one embodiment, to resolve the symbolic identifier "$targetInfoService.targetIpAddr," the AngularJS $injector service is used to find the service name represented by targetInfoService. This service name is combined with the remainder of the symbolic identifier resulting in an expression that can evaluated to obtain the value of the item contained within the angularJS service. A sample code for carrying out the process is as follows:

var serviceName="targetInfoService";
    var reference="targetIpAddr";
    var service=$injector(serviceName);
    var expr="service."+reference;
    var value=eval(expr);

In one embodiment, once the symbolic identifier has been resolved, at 710 the process 700 establishes a link between the data on the target device 102 and the corresponding data displayed in the web application 116 on the client device 114. At 712, the process 700 continues to maintain the synchronization of the value of the data on the target device and the corresponding data on the client device for the remainder of the inspection activities carried out by the target device. For example, at 712, the process 700 may perform the object data value synchronization 600 described in FIG. 6 to push value object change notifications 606 to the client device 114.

In one embodiment, the link service 502 and the corresponding web application link services 122 for data bound components deployed on the client device 114 may be implemented in one or more methods of a custom service 118 of the web application 116. The services 118/122 are typically composed of reusable and self-contained pieces of code, such as those contained in the aforementioned AngularJS development framework, and referred to as an Angular service.

Exemplary methods of an embodiment of the link service 502 are summarized in Table 2, in which the term "mslinkId" refers to the symbolic identifier link ID 504a/504b and the term "mslink" refers to the linked object 506a/506b (FIG. 5).

TABLE 2

Example methods of a link service

| METHOD | PARAMETERS | RETURNS | DESCRIPTION |
|---|---|---|---|
| resolve( ) | mslinkId-String the mslink identifier<br>index-Integer (optional) the parameter index (if the mslink resolves to a parameter)<br>obj-Object (optional) if specified, resolve the mslinkId against properties of the object instead of the default services | mslink object | Interprets the supplied mslinkId and returns an mslink object which can be used to interact with the corresponding data item. All references to the same mslinkId will return the same mslink instance. |

TABLE 2-continued

Example methods of a link service

| METHOD | PARAMETERS | RETURNS | DESCRIPTION |
| --- | --- | --- | --- |
| registerAlias( ) | mslinkId-String the mslink identifier alias-String an alternate string that will resolve to the provided mslinkId. | | Register a shortcut to a mslinkId |
| registerExtraInfo( ) | mslinkId-String the mslink identifier info-Object an object that will be associated with the given mslinkId. | | Register extra information that can be used with the mslinkId. This is used to store extra information and behaviors for symbology selection, as an example. |

Notwithstanding the above-described examples, it should be understood that any data object or control within the web application 116 user interface may be capable of becoming a linked object 506a/506b corresponding to a bindable data item 510 or data bound control 512 on the target device 102, and accessible on the client device 114 via a link service 502. For example, data objects and controls in web application 116 may correspond to certain target device 102, client device 114 and/or other system or user settings not related to a read cycle report.

In one embodiment, since the read/write access to each data item and/or control is facilitated using the link service 502 (FIG. 5), over time a history of changes to the data items and controls can be stored for future access as described with reference to the correlated historical data 418 (FIG. 4a) and with further reference to the object data value synchronization (FIG. 6). Advantageously, the stored change history permits a user of the web application 116 on client device 114 to review the stored change history of any data value, including data representing images and controls that correlate the images with all of the other bindable data items 510 or data bound controls 512 (FIG. 5) that were in effect at the same moment in time.

As an example, finding an optimal group of settings on target device 102 that maximize performance and robustness of an inspection job being carried out by the target device 102 in a data acquisition system 200 can often require trial and error. However, using a client device 114 operating in conjunction with a target device 102 in accordance with the described embodiments, a user of web application 116 on client device 114 can view a UI display of various graphs of performance information 408b and parameter values 408c that were in effect at various points in time 412 (FIG. 4b) to quickly find the optimal group of settings.

In one embodiment, alongside the display of the various graphs, the client 114 web application 116 UI can be configured to display a corresponding stored history of values (decode strings, etc.), a filmstrip of images, and other displayable data items and data controls depicting data from the target device 102 at a certain point in time. The user can browse the graphs and select a value on the graph that appears to the user to represent a moment in time when conditions on the target device 102 that affect the performance and robustness of the inspection job are optimal.

In one embodiment, upon receiving the user's selection of the value that appears optimal, the client UI displays the other information in effect at the same moment in time, such as the image(s), parameters, settings, cycle report data, and other performance data. From this client 114 web application 116 UI display, the user can then select the optimal group of settings to use for current and future inspection jobs. The user can repeat the selection process as needed to ensure that inspection performance and robustness are maximized.

In one embodiment, the stored correlated historical data 418 (FIG. 4) of values and other information, such as the image(s), parameters, settings, cycle report data, and other performance data, although determined to have been in effect at the same moment in time, may or may not have actually been generated at the same time, or even made available via the same communication service/communication interface.

The above-described features associated with using the link service 502 and linked objects 506a/506b, including facilitating client 114 access to bindable data items 510 and bindable data controls 512 on the target device 102, and facilitating performance analysis and optimization by storing over time a history of changes to the linked objects 506a/506b, are also useful for facilitating testing and external control of data acquisition systems.

In one testing scenario, an automated UI testing application may directly set the values of linked objects 506a/506b to simulate certain conditions of an inspection job, such as if the user changed a setting within the web application 116 UI on the client device 114 or the value was received via a cycle report generated on the target device 102. In addition, if an automated test detects a problem with the inspection job, the problem can be correlated with all of the information that was also in effect at the moment in time that the problem occurred.

Figure 8:
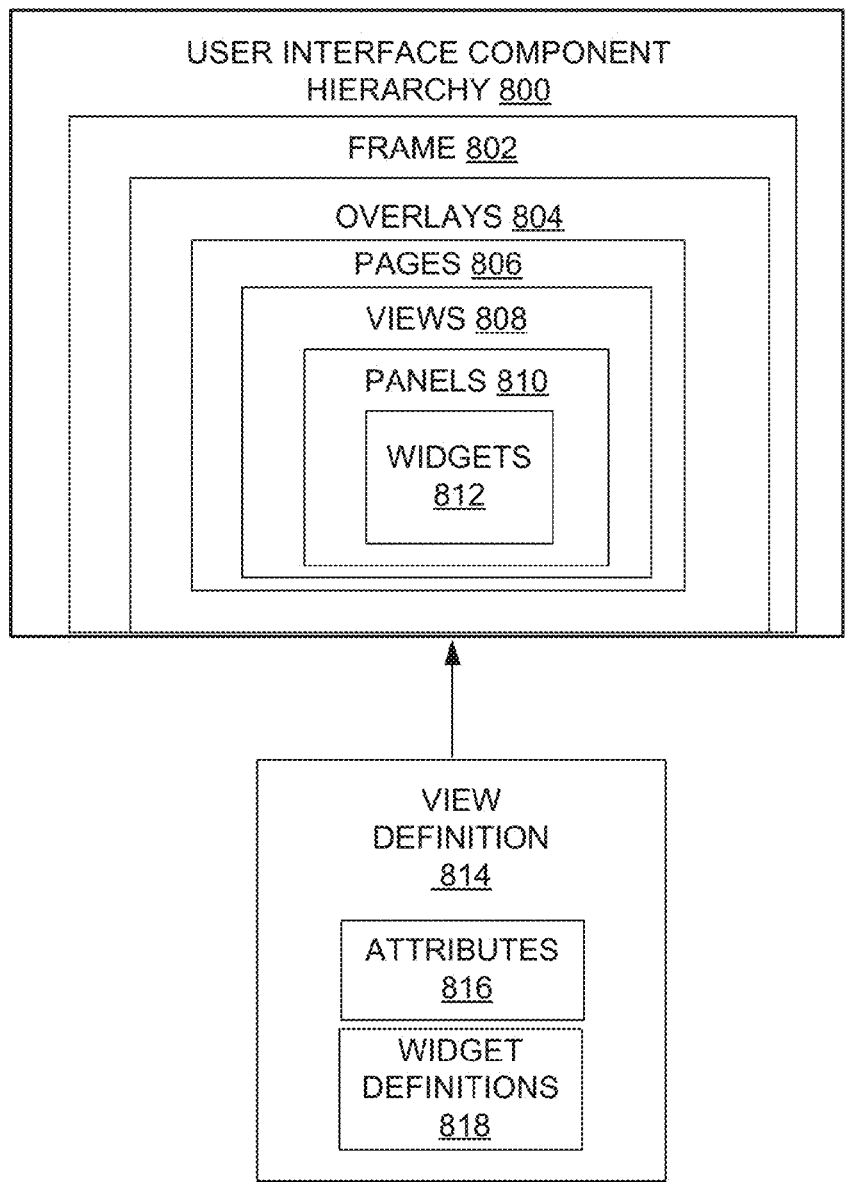
FIG. 8 is a block diagram of an embodiment of a user interface component hierarchy for a data acquisition system supporting a web-based interface to an embedded web server as in FIG. 1.

FIG. 8 illustrates an embodiment of a user interface (UI) component hierarchy for a data acquisition system supporting a web-based interface to an embedded web server as described in FIG. 1. In order to take advantage of the standardization of web technologies, embodiments of the web-based interface to the embedded web server employ a user interface component hierarchy 800 that facilitates customizing the layout of the user interface.

The frame component 802 is the outermost structure of the UI, consisting of a banner area, a status bar, and the general layout and style of the web application 116. The overlay component 804 includes the alerts, dialogs, windows, help bubbles, and other graphical components that are superimposed over the display of other content of the pages 806 as needed during the operation of the web application 116.

The page components 806 define the principal contents of the web application 116. In one embodiment, each page is constructed from a page template, an independent unit of AngularJS-capable HTML (Hyper Text Markup Language). The resulting page is referred to as an instance of an AngularJS directive, or view directive. During operation of the web application 116, a desired page is typically selected via a navigational control, such as an arrow button displayed in a banner display in the frame component 802. In one embodiment, multiple buttons may share the same page template, but with different options selected. For example, three arrow buttons, such as start, setup, and run buttons, displayed in the banner of frame 802 may all share the same page template, but will display different content and/or options to the user.

In one embodiment, the remaining view 808, panel 810 and widget 812 UI components are constructed from the aforementioned view directive. During operation of the web application 116, the view directive displays a view 808 created by interpreting a view definition file 814. The view definition file 814 contains a description of the layout of the view 808 as one or more panels 810, each of which contains an array of widgets 812.

In one embodiment, the description of the layout is implemented as one or more JSON objects with properties that define layout of the panels 810 and widgets 812. Each panel 810 defines a rectangular region of the view 808. The bounds of the panel 810 can be set with style sheet functions, such as the CSS (Cascading Style Sheets) style sheet language. An example of the properties of JSON objects from which a view 808 can be created are summarized in Table 3.

TABLE 3

Example properties of JSON objects from which a view is created

| PROPERTY | EXPLANATION |
| --- | --- |
| "stylesheet" | This optional property can be used to specify an external stylesheet which will be loaded along with the view. The stylesheet can then be used to layout, size, and style the various panels and widgets. Alternately, this information can be completely defined by using "css" properties within the view definition file. |
| "panels" | This property defines an array of widget definition objects. Each panel represents an area of the view which is populated by widgets. |

The description of the layout contained in the view definition file 814 typically includes attributes 816 and widget definitions 818 that control the appearance of the view 808, panel 810 and widget 812 UI components. The widget UI components 812 are self-contained functional units, such as the step list, image display and chart widgets described in FIG. 14.

Examples of the attributes 816 that can be applied when creating a view are summarized in FIGS. 15A-15B.

Figure 9:
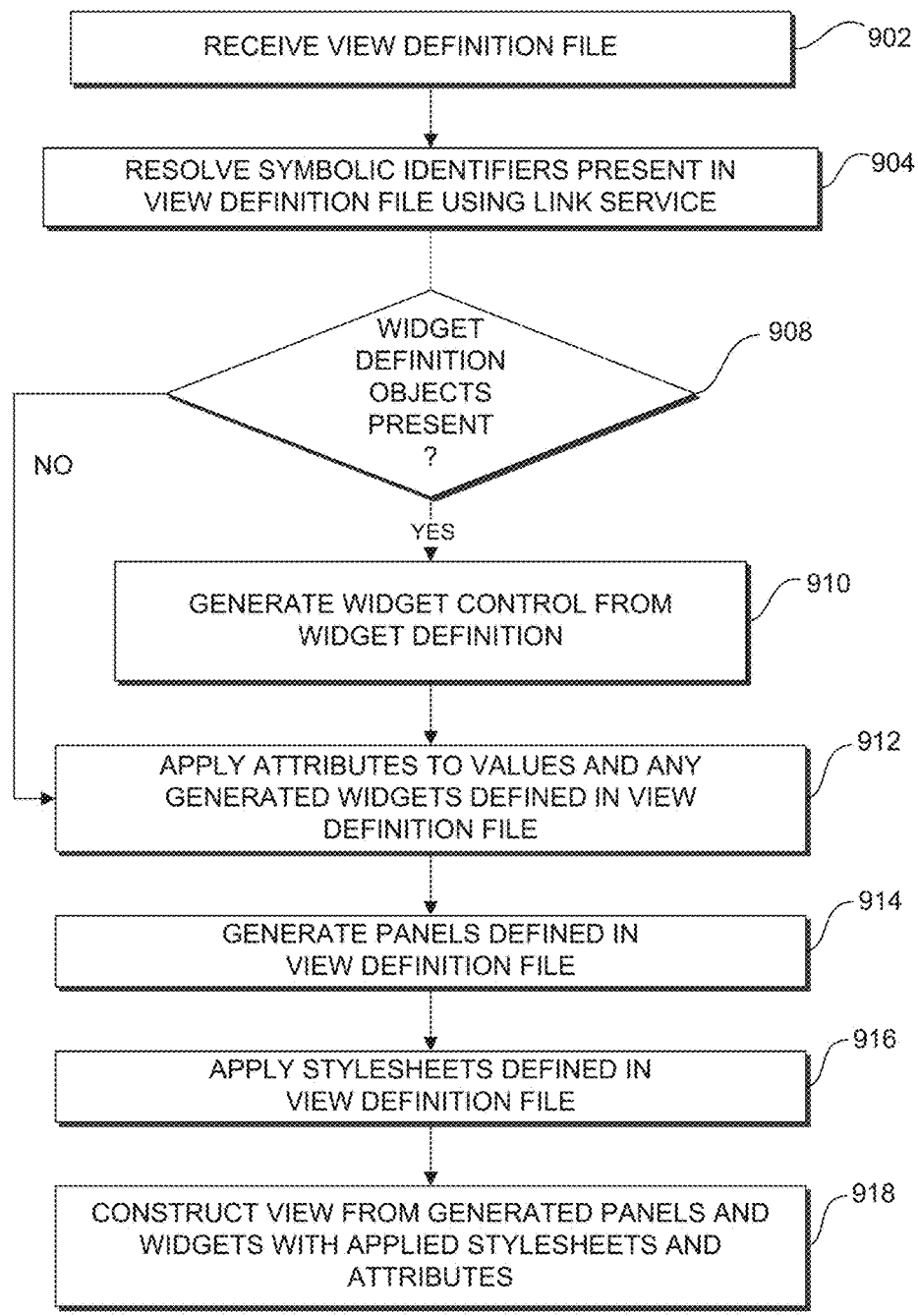
FIG. 9 is a flowchart of an embodiment of another process for constructing a user interface in a data acquisition system supporting a web-based interface to an embedded web server as in FIG. 1.

FIG. 9 illustrates an embodiment of a process 900 for constructing a view 808 (FIG. 8) for a web-based interface 116 to an embedded web service 104 as described in FIG. 1. The process 900 begins at 902 in which a view directive receives a view definition file 814 (FIG. 8). At 904, the view directive resolves any symbolic identifiers representing bindable data items that may be present in the view definition file using the link service 502 (FIG. 5). At 908 the view directive determines whether there are any data bound controls, such as widget definition objects present, and if so, continues at 910 to resolve any symbolic identifiers representing bindable data items contained in the data bound control. The process 900 continues at 910 to generate a UI control from the data bound control, for example to generate the widget UI control from the widget definition.

At 912, once the any widget UI controls have been generated, the view directive applies the attributes to the values of the data items and generated widgets as defined in the view definition file. After the attributes have been applied, at 914 the view directive generates the panels defined in the view definition file.

The process 900 concludes at 916 by applying the stylesheets defined in the view definition file, and finally by constructing 918 the view from the generated panels and widgets along with the applied stylesheets and attributes.

Figure 10:
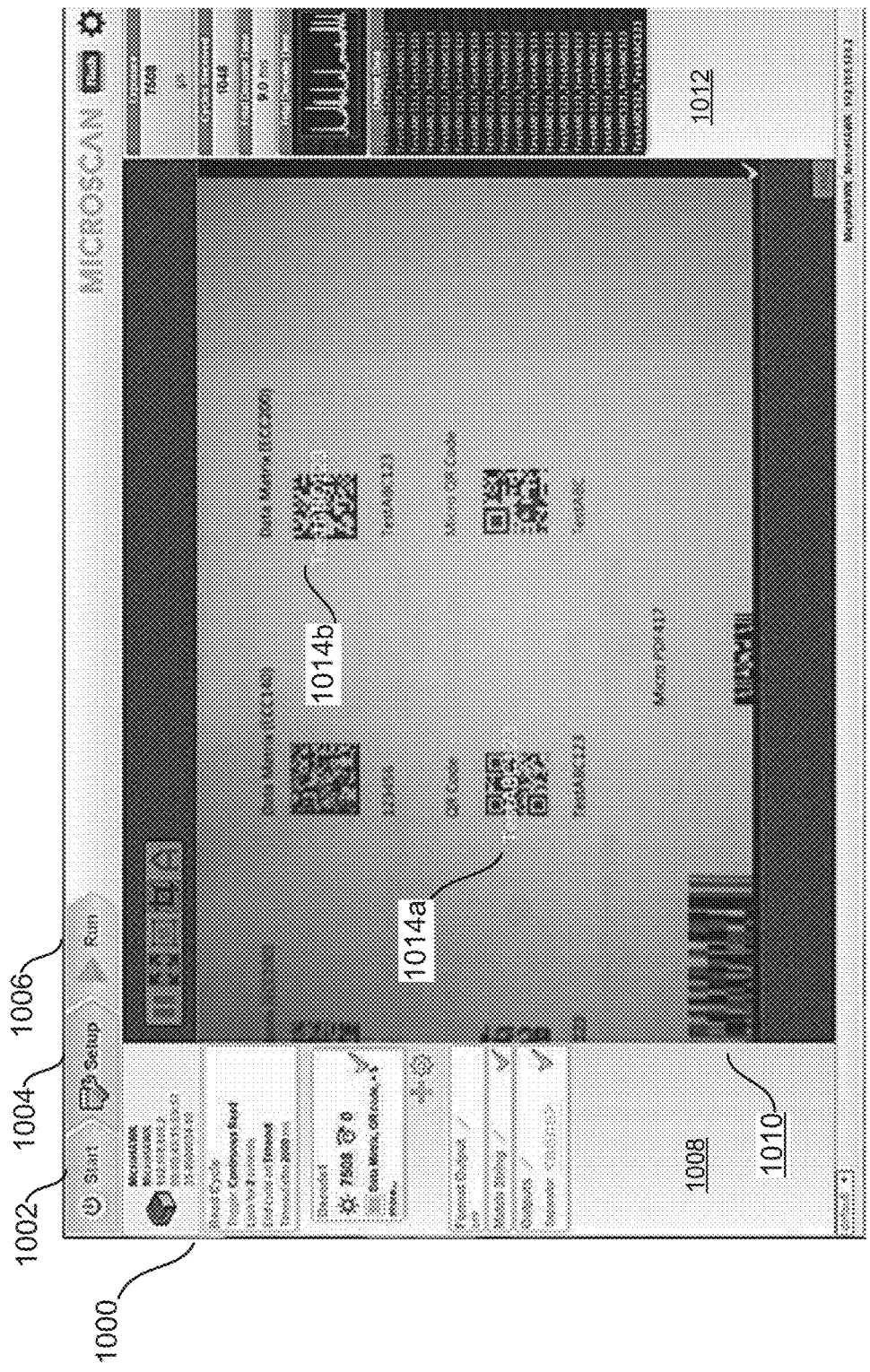
FIG. 10 is an illustration of an embodiment of a view user interface component of a data acquisition system supporting a web-based interface to an embedded web server as in FIG. 1.

FIG. 10 is an illustration of an embodiment of a view user interface of a data acquisition system supporting a web-based interface 116 to an embedded web server 104 as in FIG. 1. By way of example only, FIG. 10 illustrates a view user interface 1000 constructed for the web application interface 116 on client 114. In a one embodiment, the view 1000 is constructed from a view definition file as described with reference to FIG. 9. In the illustrated example of FIG. 10, the view 1000 includes a left panel 1008 containing device-info and step-list UI components, a right panel 1012 that includes multiple data-widget components, and a center panel that contains an ip-image UI component 1010, including image data that was acquired by a target device 102 and fetched by the web application 116 based on the UID supplied in the related cycle report. For display in the center panel, the image data can be overlaid with information related to the image, such as the textual information "Test-ABC123." 1014a/1014b. In one embodiment, the view user interface 1000 includes "Start" 1002, "Setup" 1004 and "Run" selections to control the operation of the web application interface 116. In the illustrated embodiment the displayed UI components are populated with examples of values for the bindable data items and data bound controls as described in FIG. 13.

Figure 11:
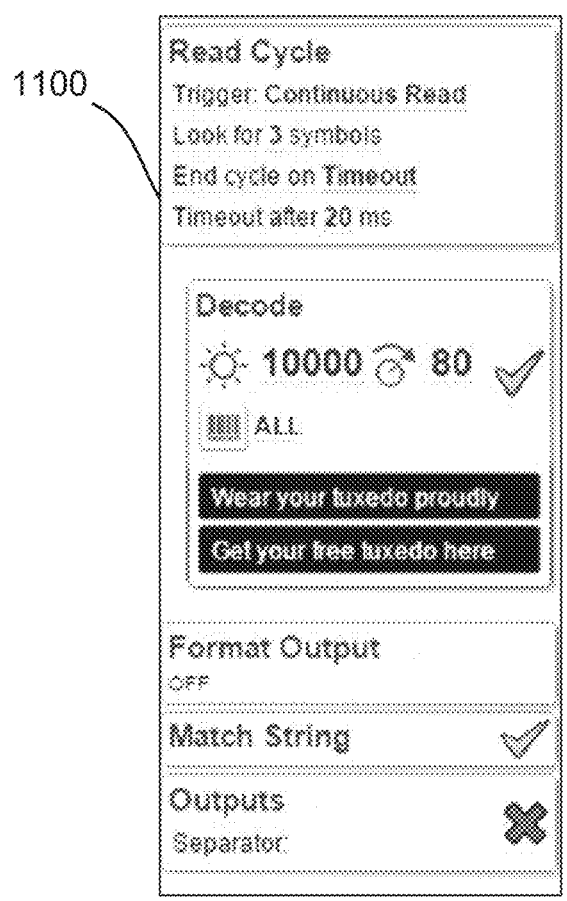
FIG. 11 is an illustration of an embodiment of a step list user interface component of a data acquisition system supporting a web-based interface to an embedded web server as in FIG. 1.

An example of bindable data items, data bound controls, and a corresponding generated UI control component is further illustrated in FIG. 11. More specifically, by way of example only, FIG. 11 is an illustration of an embodiment of a step list UI component 1100 such as might be displayed in the left panel 1008 of the view user interface 1000 described with reference to FIG. 10. The step list UI component 1100 displays information contained in the cycle report and/or other data related to the data acquisition cycle and further related to the image data currently on display in the center panel 1010 of the view 1000.

In the example of the step list UI component 1100 in FIG. 11, the symbolic identifiers of TRIGGER_MODE, NUM_SYMBOLS, END_CYCLE_MODE and END_CYCLE_TIMEOUT, are each resolved to their corresponding data item value using the link service "mslink" and the resulting values are formatted for display in accordance with graphical display controls in the step list UI component 1100.

Another example of a bindable data item and data bound control is the image definition object, referred to as the "ip-image" type of display control in FIG. 13, some examples of which are illustrated in the center panels of view in FIG. 9. In general, embodiments of the ip-image control display one or more images acquired by the target device 102 and any associated image processing data. The image processing data may include positions and bounds of objects identified within the image, performance data and other graphics associated with the image, including any overlay data to be overlaid on the image.

In one embodiment of a data acquisition system, for target devices 102 that include an image sensor based product, the corresponding image display control for displaying the images, such as the above-described "ip-image" type of display control in FIG. 13, controls the display of a single inspected image and any associated data and graphics. This display may be updated rapidly to show a "live" display of the inspection process. It is also common to display a history of such images in a "filmstrip" display control, each frame representing a previous inspection or read result. A filmstrip shows the individual images evenly spaced, as if they were frames on camera film.

Figure 12A:
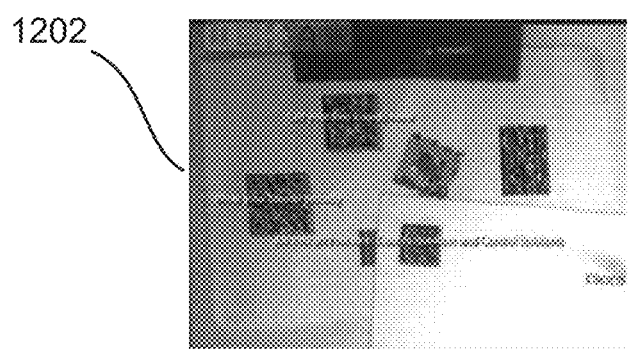
FIGS. 12A-12E are illustrations of an embodiment of an image display control for viewing a single image, multiple images and a time scale of multiple images for the user interface components of a web-based interface to an embedded web server as in FIG. 1.

An example of this type of display control is illustrated in FIG. 12A, in which the image display control operating in what is referred to as "Single Mode," displays a single image 1202, along with any associated image processing information.

Figure 12B:
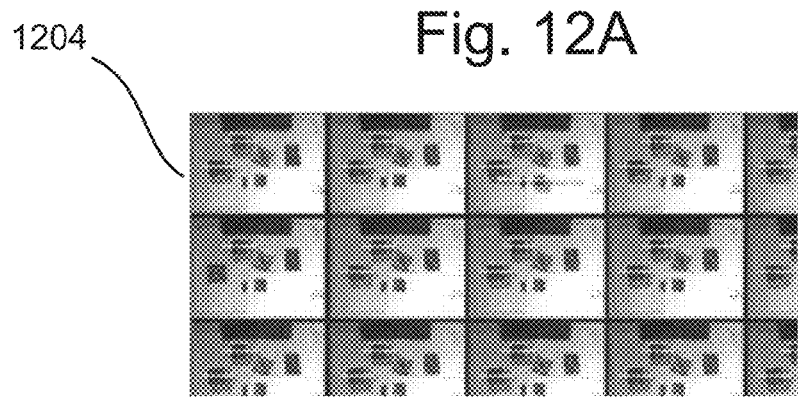

However, many applications require multiple images to achieve a single result. A common reason is that the product to inspect is physically larger than can be captured within a single sensor's field of view. This is dealt with by either using multiple sensors or by physically moving the sensor or the product. In this scenario the image display control operates in "Multiple Mode," illustrated in FIG. 12B, to control the display 1204 of multiple images, either to show historical information, or to display a group of images that were all used to produce a single result.

There are also situations where multiple images are acquired at the same product location to improve the robustness of an inspection or decode operation being carried out by the data acquisition system. In this situation each image is acquired at the same position, but at a different moment of time. When setting up these types of applications, timing can present challenges not addressed by the Single Mode and Multiple Mode of the image display control.

Figure 12C:
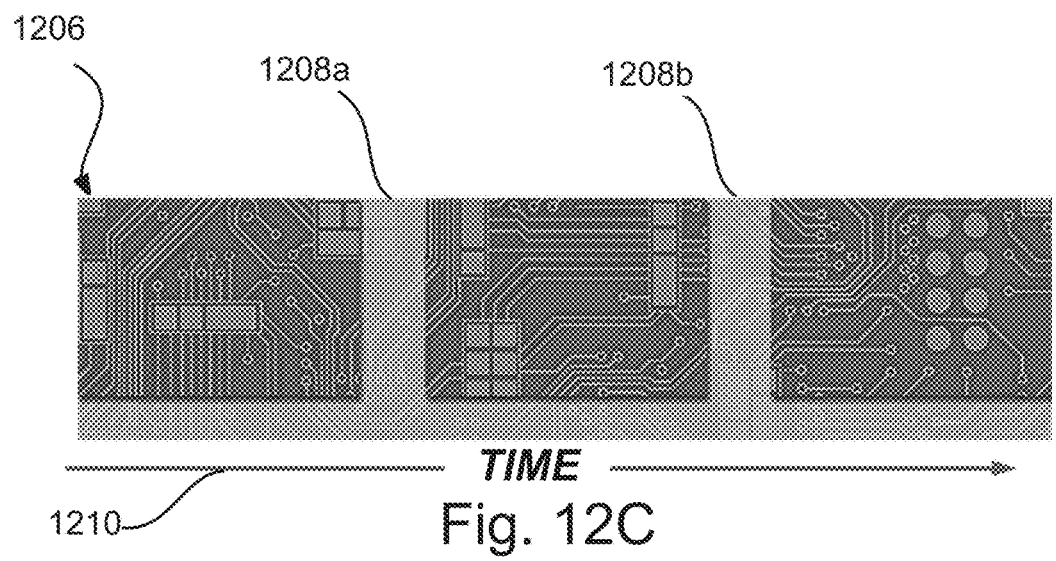

For example, in one embodiment illustrated in FIG. 12C, multiple images of a circuit board 1206 moving by an image sensor are displayed from left to right. In this example, the circuit board 1206 is not completely covered by the images, as evidenced by the gaps 1208*a* and 1208*b* between the first, second and third images of the board. In such a scenario it is desirable to acquire images at exactly the right speed to most efficiently cover the entire board as it travels along the path of the acquisition device's field of view.

If the display of FIG. 12C is updated "live", it would be straightforward adjust the delay until full coverage (or partial overlapping coverage) is achieved. For example, the gaps between the images can be corrected by adjusting an inter-image delay setting on the target device, possibly by using a slider range UI control (not shown). The challenge is to set up the acquisition timing so that the board is sufficiently covered for processing. This becomes particularly challenging if all the timing and dimensional information is not known beforehand. As a result, finding the right speed of image acquisition can often involve trial and error.

In one embodiment, in order to aid in the setup of an application that involves timing, the image display control operates in Time Scale Mode by using a time scale to manage the display of the images. For example, imagine that the sensor can acquire a 1000 pixel wide image every 50 ms. The display of the image could be time-scaled so that each unit in width would represent $^{50}/_{1000}=^{1}/_{20}$ of a millisecond. As multiple images are acquired, precise timing information is maintained relative to the start of the sequence.

In Time Scale Mode, the image display control converts this precise timing information to visual spacing of the multiple images within the image display control along a time axis, also referred to as displaying a time-scaled image. In this manner, the Time Scale Mode operation of the image display control provides useful information to the user for visualizing and diagnosing timing issues with the target device's 102 operation, or setting up a complex triggering scenario that initiates the data acquisition cycle as illustrated in FIGS. 4*a*/4*b*.

For example, in the example illustrated in FIG. 12C the time axis can be represented in a graphic overlaid or otherwise integrated into the image display control. As shown, the time axis is represented as a TIME-labeled arrow graphic 1210 to indicate the timing associated with the images of the board 1206 as it travels past the camera's field of view.

Figure 12D:
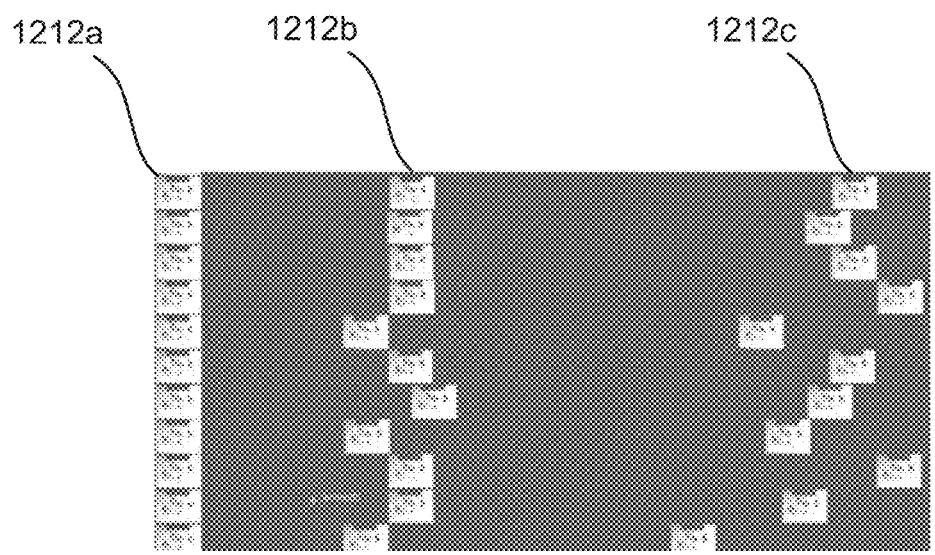

Another example of using the Time Scale Display mode of operation in an image display control would be to detect timing jitter. For example, in one embodiment, as illustrated in FIG. 12D, each read cycle output requires three images, and each row of the display represents a single read cycle. The first image within each cycle is acquired simultaneously using a trigger, resulting in all of the images in the first column 1212*a* being positioned flush on the left side of the display. The subsequent two images of each read cycle are spaced in time relative to the trigger and positioned on the display accordingly.

In the above scenario, if the timing were precise, the images would display aligned in strict columns. However, in this example, the timing is not that accurate, and that is clearly evident in the display, where the images in the second 1212*b* and third 1212*c* columns are positioned irregularly on the display. In one embodiment of the image display control, this resulting "jitter" of the images can be corrected by adjusting an inter-image delay, possibly by using the slider range UI control, and repeating the adjustment until the image display control displays the second and third columns in proper alignment.

Figure 12E:
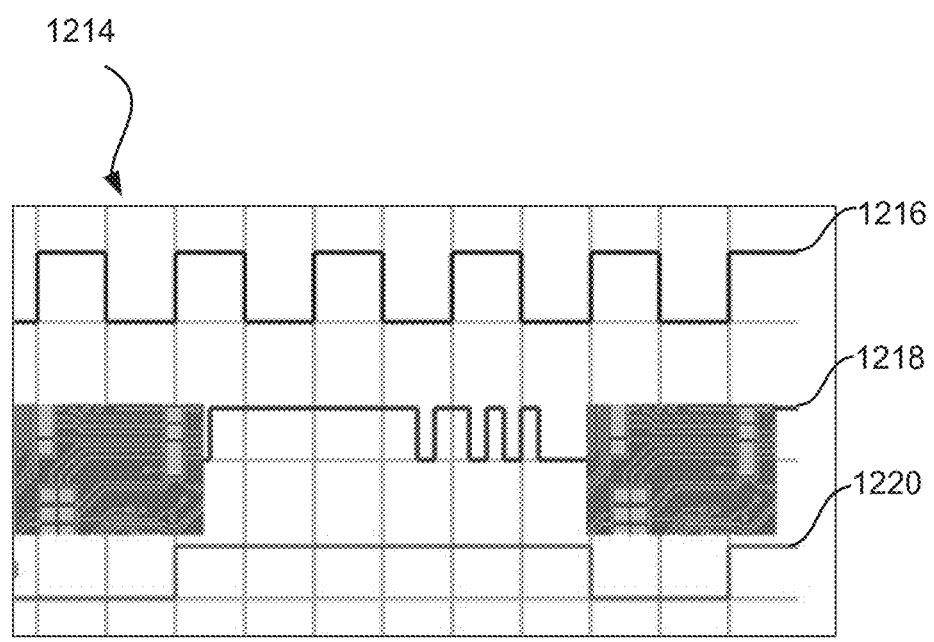

As another example of using the image control display in Time Control Mode, the above-described time-scaled image display is combined with a more traditional timing diagram as shown in the display illustrated in FIG. 12E. In one embodiment of Time Control Mode operation of the image display control, the display 1214 of multiple images of the board 1206 includes a first timing signal 1218 that the image display control superimposes on the images of the board 1206 to clearly show the timing of image acquisitions.

Alternatively or in addition, embodiments of the image display control can display one or more other timing signals. For example, with reference again to FIG. 12E, the image display control can display timing signal 1216 and timing signal 1220 in parallel with the images of the board 1206 and the first timing signal 1218. In this manner, the image display control is able to show the timing of the image acquisitions relative to the other timing signals 1216, 1220.

In one embodiment, the display of the timing signals 1216, 1220 is triggered by a combination of events and displays timing information originating from various sources, including the timing information 1218 associated with the time-scaled images themselves.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a web-based interface to a web server embedded in a data acquisition device, the method comprising:
   in a client device:
      establishing a connection between one or more proxy objects in a web application on the client device and data objects in a web server embedded in the data acquisition device;
      configuring user interface (UI) components with the one or more proxy objects, the UI components representing one or more processes performed on the data objects in the data acquisition device;

constructing a view of the one or more processes performed on the data objects in the data acquisition device, the view constructed from the UI components and the values of the data objects in the data acquisition device as reflected in the proxy objects;

displaying the view in the web application's interface on the client device; and synchronizing the data objects with the proxy objects to reflect in the view any changes in the values of the data objects on the data acquisition device.

2. The method of claim 1, wherein configuring the UI components to represent one or more processes performed on the data acquisition device includes:

combining conceptually related processes performed on the data acquisition device into one or more of the UI components; and configuring a high level parameter in one of the UI components to manage multiple parameters on the data acquisition device, the multiple parameters corresponding to data objects connected with proxy objects.

3. The method of claim 1, wherein establishing the connection between the one or more proxy objects and the data objects includes:

requesting on demand from the embedded web server a value object definition of the data object;

receiving the value object definition from the embedded web server using a data exchange protocol; and linking one or more proxy objects to one or more data objects based on the value object definition, wherein linking includes resolving symbolic identifiers in the value object definition.

4. The method of claim 1, wherein the UI components include any one or more of a device info to display information about the data acquisition device, a data widget for displaying values of data objects, a step list processing data objects containing a cycle report generated in the data acquisition device, and an ip-image controlling the display of data objects containing one or more images acquired by the data acquisition device and referenced in the cycle report.

5. The method of claim 4, wherein the cycle report and images are received asynchronously and correlated for display in the view on the client device, the correlating including:

parsing the cycle report to obtain information related to the one or more images, including a list of unique IDs of the one or more images;

fetching the one or more images using the list of unique IDs; and combining the one or more images with information in the cycle report.

6. The method of claim 5, wherein the ip-image controlling the display of data objects containing the one or more images fetched using the list of unique IDs operates in any one or more of:

a single image mode to display a single image;

a multiple image mode to configure multiple images for display along a time axis;

a time scale mode to scale an image width to represent an acquisition time and to position each image of the multiple images to represent a delay in the acquisition time, the delay represented as a gap between the multiple images; and a time control mode to superimpose on the display of the images one or more timing signals parallel to the time axis.

7. The method of claim 6, further comprising:

responsive to the display revealing irregular positioning of the multiple images indicative of a timing error, receiving an input from a user of the client device to adjust a high level parameter in the ip-image UI component to adjust one or more parameters on the data acquisition device to correct the timing error; and receiving additional input from the user to repeatedly adjust the high level parameter to correct the timing error until the irregular positioning revealed in the display is substantially eliminated.

8. The method of claim 7, wherein the display of multiple images is arranged in rows and columns, each row of the display representing a single data acquisition cycle and the irregular positioning indicative of the timing error is multiple images misaligned in the columns indicative of timing jitter, the method further comprising:

receiving additional input from the user to repeatedly adjust the high level parameter to correct the timing jitter until the multiple images in the columns are aligned.

9. The method of claim 1, wherein:

establishing the connection between the data objects and the proxy objects is performed using a first communication channel for communicating with the client on demand; and synchronizing the data objects and the proxy objects includes:

transmitting the value object definition to the client on demand using the first communication channel, and pushing change in value notifications about changes to the data objects to the client as needed using a second communication channel different from the first communication channel.

10. The method of claim 9, wherein the second communication channel for receiving the change in value notifications is a web socket connection established between the client device and the data acquisition device, the method further comprising:

applying the change notification to the proxy object to reflect the changed value of the data object.

11. The method of claim 1, wherein constructing the view is based on a view definition file received from a user of the client device, the view definition file customizing the view in accordance with the user's requirements.

12. A system for a web-based interface to an embedded web server, the system comprising:

a client device in communication with a data acquisition device, the client device having a display interface, two or more communication interfaces and a processor, the processor configured to:

establish a connection between one or more proxy objects in a web application on the client device and data objects in a web server embedded in the data acquisition device;

configure user interface (UI) components with the one or more proxy objects, the UI components representing one or more processes performed on the data objects in the data acquisition device;

construct a view of the one or more processes performed on the data objects in the data acquisition device, the view constructed from the UI components and the values of the data objects in the data acquisition device as reflected in the proxy objects;

display the view on the display interface of the client device; and synchronize the data objects with the proxy objects to reflect in the view any changes in the values of the data objects on the data acquisition device.

13. The system of claim 12, wherein to configure the UI components to represent one or more processes performed on the data acquisition device, the processor is further configured to:

combine conceptually related processes performed on the data acquisition device into one or more of the UI components; and configure a high level parameter in one of the UI components to manage multiple parameters on the data acquisition device, the multiple parameters corresponding to data objects connected with proxy objects.

14. The system of claim 12, wherein to establish the connection between the one or more proxy objects and the data objects, the processor is further configured to:

request on demand from the embedded web server a value object definition of the data object;

receive the value object definition from the embedded web server using a data exchange protocol; and link one or more proxy objects to one or more data objects based on the value object definition, wherein linking includes resolving symbolic identifiers in the value object definition.

15. The system of claim 12, wherein the UI components include any one or more of a device info to display information about the data acquisition device, a data widget for displaying values of data objects, a step list processing data objects containing a cycle report generated in the data acquisition device, and an ip-image controlling the display of data objects containing one or more images acquired by the data acquisition device and referenced in the cycle report.

16. The system of claim 15, further comprising:

the client device in communication with the data acquisition device, is configured to receive the cycle report and images asynchronously;

the processor is further configured to correlate the cycle report and images for display in the view on the client device, including to:

parse the cycle report to obtain information related to the one or more images, including a list of unique IDs of the one or more images;

fetch the one or more images using the list of unique IDs; and combine the one or more images with information in the cycle report.

17. The system of claim 16, wherein the processor performs the ip-image UI component to control the display to operate in any one or more of:

a single image mode to display a single image;

a multiple image mode to configure multiple images for display along a time axis;

a time scale mode to scale an image width to represent an acquisition time and to position each image of the multiple images to represent a delay in the acquisition time, the delay represented as a gap between the multiple images; and a time control mode to superimpose on the display of the images one or more timing signals parallel to the time axis.

18. The system of claim 17, wherein the processor performs the ip-image UI component to control the display to:

receive an input from a user of the client device responsive to the display revealing irregular positioning of the multiple images indicative of a timing error;

adjust a high level parameter in the ip-image UI component causing the data acquisition device to adjust one or more parameters to correct the timing error; and receive additional input from the user; and repeatedly adjust the high level parameter to correct the timing error until the irregular positioning revealed in the display is substantially eliminated as a result of causing the data acquisition device to adjust one or more parameters to correct the timing error.

19. The system of claim 18, wherein the processor controls the display to arrange the multiple images in rows and columns, each row of the display representing a single data acquisition cycle and the irregular positioning indicative of the timing error is multiple images misaligned in the columns indicative of timing jitter, wherein the processor performs the ip-image UI component to control the display to:

receive additional input from the user to repeatedly adjust the high level parameter to correct the timing jitter until the multiple images in the columns are aligned.

20. The system of claim 12, wherein to establish the connection between the data objects and the proxy objects, the client device is configured to use a first communication channel for communicating with the client on demand, and further wherein to synchronize the data objects and the proxy objects, the client device is further configured to:

transmit the value object definition to the client on demand using the first communication channel, and push change in value notifications about changes to the data objects to the client as needed using a second communication channel different from the first communication channel.

21. The system of claim 20, wherein the second communication channel used to receive the change in value notifications is a web socket connection established between the client device and the data acquisition device, and further wherein the processor is configured to:

apply the change notification to the proxy object to reflect the changed value of the data object.

22. The system of claim 12, further comprising:

the client device configured to receive a view definition file from a user of the client device, the view definition file customizing the view in accordance with the user's requirements; and further wherein the processor is configured to construct the view based on the view definition file.

23. At least one computer-readable storage medium including instructions that, when executed on a web application operating on a client device in communication with an embedded web server operating on a data acquisition device, cause the web application to implement a method to:

establish a connection between one or more proxy objects in the web application and data objects accessed via the embedded web server;

configure user interface (UI) components with the one or more proxy objects, the UI components representing one or more processes performed on the data objects in the data acquisition device;

construct a view of the one or more processes performed on the data objects in the embedded web server, the view constructed from the UI components and the values of the data objects as reflected in the proxy objects;

display the view in the web application's interface on the client device; and synchronize the data objects with the proxy objects to reflect in the proxy objects any changes in the values of the data objects.

24. The computer readable medium of claim 23, wherein the method implemented to configure the UI components to represent one or more processes performed on the data acquisition device causes the web application to further implement a method to:

combine conceptually related processes performed on the data acquisition device into one or more of the UI components; and configure a high level parameter in one of the UI components to manage multiple parameters on the data acquisition device, the multiple parameters corresponding to data objects connected with proxy objects.

25. The computer readable medium of claim 23, wherein the method implemented to establish the connection between the one or more proxy objects and the data objects causes the web application to further implement a method to:

request on demand from the embedded web server a value object definition of the data object;

receive the value object definition from the embedded web server using a data exchange protocol; and link one or more proxy objects to one or more data objects based on the value object definition, wherein linking includes resolving symbolic identifiers in the value object definition.

* * * * *